United States Patent [19]

Metabi

[11] Patent Number: 4,525,037
[45] Date of Patent: Jun. 25, 1985

[54] OBJECTIVE LENS ASSEMBLY OF VARIABLE FOCAL LENGTH HAVING A DIAPHRAGM MECHANISM WITH ADJUSTABLE APERTURE

[75] Inventor: Tsuneyo Metabi, Sakai, Japan

[73] Assignee: Minolta Camera Kabushiki Kaisha, Osaka, Japan

[21] Appl. No.: 502,204

[22] Filed: Jun. 8, 1983

[30] Foreign Application Priority Data

Jul. 9, 1982 [JP] Japan .................... 57-120320

[51] Int. Cl.³ .......................... G02B 9/08; G02B 7/10
[52] U.S. Cl. ..................................... 350/450; 350/429
[58] Field of Search ................ 350/450, 449, 448, 429, 350/430, 423–428; 354/195.11

[56] References Cited

U.S. PATENT DOCUMENTS

| | | | |
|---|---|---|---|
| 4,141,636 | 2/1979 | Shimojima | 350/429 |
| 4,159,864 | 7/1979 | Yasukuni et al. | 350/450 |
| 4,258,996 | 3/1981 | Uesugi et al. | 354/195.11 |
| 4,273,414 | 6/1981 | Shimojima | 350/449 |
| 4,334,746 | 6/1982 | Nazawa et al. | 354/195.11 |

OTHER PUBLICATIONS

"Modern Tests" in *Modern Photography*, Nov. 1977, pp. 164–168.

*Primary Examiner*—Jon W. Henry
*Attorney, Agent, or Firm*—Watson, Cole, Grindle & Watson

[57] ABSTRACT

A zoom lens assembly for use with a photographic camera having a capability of functioning two different modes one at a time. In one mode, the lens assembly is of a type having its aperture ratio variable with change in focal length, and in the other mode, it is of a type wherein change in aperture ratio resulting from the change in focal length is compensated for to give a uniform aperture ratio at all focal length settings. For this purpose, a unique change-over mechanism is built in the lens assembly for switching the lens assembly from one of the different modes onto the other of the different modes at the will of a photographer.

22 Claims, 37 Drawing Figures

Fig. 7
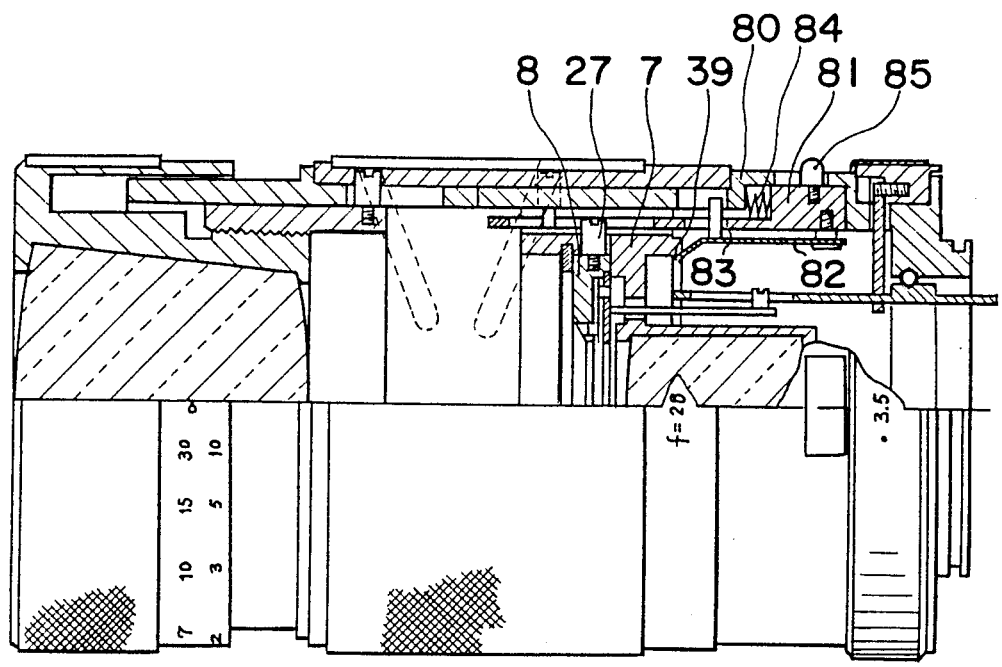
Fig. 11(a) Fig. 11(c) Fig. 11(e)
Fig. 11(b) Fig. 11(d)
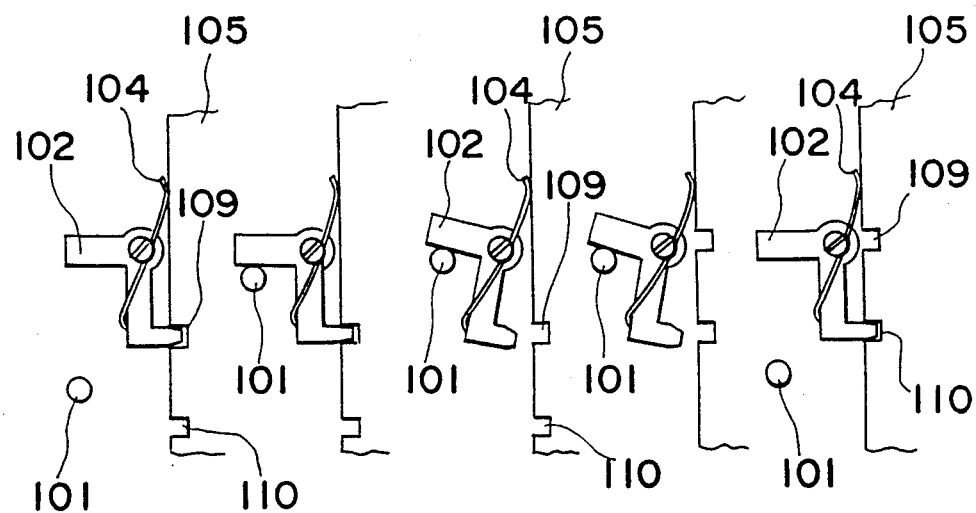

OBJECTIVE LENS ASSEMBLY OF VARIABLE FOCAL LENGTH HAVING A DIAPHRAGM MECHANISM WITH ADJUSTABLE APERTURE

BACKGROUND OF THE INVENTION

This invention generally relates to an objective lens assembly of variable focal length for use with an optical picture taking apparatus, for example, a photographic still camera, a movie camera or a television camera. More particularly, this invention relates to a varifocal lens assembly of a type wherein the lens speed or the aperture ratio of the lens assembly varies with a change in the focal length.

Current commercially available zoom lens assemblies are generally classified into fixed speed types whose optical systems are designed such that the lens speed or the aperture ratio does not vary even when the focal length thereof is adjusted for zooming with the diaphragm aperture kept unchanged, and variable speed types whose optical systems are designed such that the lens speed or the aperture ratio varies when the focal length thereof is adjusted with the diaphragm aperture kept unchanged. The variable speed type zoom lens assemblies are furthermore classified into two subtypes: compensated types, wherein a mechanical compensator system is built in for compensating for change in lens speed resulting from an change in the focal length, and non-compensated type wherein the lens speed is allowed to vary with change in the focal length without any compensator system employed. Both of these subtypes have their own merits and demerits, however they play a role in the market to accommodate a diversity of customers' demands.

As is well known to those skilled in the art, for a given diaphragm aperture, the variable speed type is generally faster, i.e., has a smaller F-stop number at the shortest focal length setting than at the longest focal length setting. To compensate for the reduction of the lens speed to make the lens speed constant at all values of focal length, means must be provided for stopping down the diaphragm aperture as the focal length is adjusted to the shortest value, and this is currently embodied in the compensated model such as disclosed in, for example, U.S. Pat. No. 4,258,996. In this compensated model, the maximum available performance of the optical system of the zoom lens assembly cannot be enjoyed, particularly when the focal length is adjusted to a wide angle range. It should be noted that the term "wide angle" hereinabove and hereinafter used and the term "tele-angle" which will hereinafter be used in an opposite sense to the term "wide angle," are a relative notation applicable to a particular adjustable range of focal length of a given zoom lens assembly and correspond respectively to the reading on a focal length setting element such as, for example, a zooming ring, approaching the shortest focal length and that approaching the longest focal length. By way of example, for any zoom lens assembly having it focal length adjustable within a range of 28 mm to 55 mm, the focal length setting to a value on the side of the 55 mm position or the longest focal length may be said to be the setting to the "wide angle" range and that to the "tele-angle" range, respectively.

As hereinbefore described, in the variable speed zoom lens assembly of the compensated type, the maximum available performance of the optical system is sacrificed at the wide angle range to tailor the lens speed or aperture ratio to a value given at the longest available focal length setting. However, this compensated model is generally considered convenient in that, since in practice the smallest available aperture reading, that is, F-stop number, on the aperture setting ring is calibrated to a value given at the longest available focal length setting, the photographer need neither readjust the aperture setting ring in an attempt to compensate for reduction in lens speed resulting from the change of the focal length, nor keep in mind the necessity of such a readjustment, and, also, the lens assembly has a consistency with the exposure control system of a photographic camera. On the other hand, although the variable speed zoom lens of non-compensated type, such as disclosed in, for example, Modern Photography, November 1977, Vol. 41, No. 11, pages 164 to 168, is advantageous in that the maximum available performance of the optical system can be fully enjoyed at any focal length setting, not only does the layout in the non-compensated model of the aperture reading on the aperture setting ring in combination with an index marking pose a problem, but also the lens assembly lacks a consistency with the exposure control system.

Specifically, in the variable speed zoom lens assembly of the non-compensated type referred to above, the smallest aperture reading on the aperture setting ring includes two F-stop numbers available generally at the wide angle range and the tele-angle range, respectively, in combination with the index marking including the juxtaposed aperture-indicating indicia associated respectively with the smallest F-stop numbers. So far as the lens assembly disclosed in the Modern Photography, supra, is concerned, it is described that the 43–75 mm zoom lens assembly is an f/3.5 for most of its zoom, i.e., the focal length setting, but becomes f/4.5 at the maximum 75 mm setting, and two juxtaposed aperture-indicated indicia are employed in the form of a line and a dot on the fixed barrel around which the aperture setting ring can be rotated.

For better understanding of this invention, the merits and demerits of each of the compensated and non-compensated models of the variable speed zoom lens assemblies will be hereinafter discussed in detail under separate headings.

I. NON-COMPENSATED MODEL

Merits: The maximum available optical performance determined by the design of the optical system can be utilized at the short focal length setting or wide angle range. Since in most cases the wide angle range is used more frequently in indoor photography than in outdoor photography and, so far as the indoor photography is concerned, more frequently than the tele-angle range is, the utilizeability of the designed maximum available optical performance at the largest diaphragm aperture setting, i.e., the smallest F-stop number or aperture reading, has a great significance in that the non-compensated model can permit a picture taking in darker indoor condition than the other model does.

Demerits: With a photographic camera having an exterior metering system, not a TTL (through-the-lens) metering system, in which the determination of a particular exposure value depends on the incoming light not passing through the picture-taking lens assembly, or with a photographic camera having no exposure metering system built therein, it is necessary to line up the selected F-stop number or aperture reading with either one of the two aperture-indicating indicia to be used respectively at the wide angle range and the tele-angle range. In particular, it is practically impossible for less skilled photographers to set an F-stop number intermediate of the available aperture setting range when the focal length is set to a value intermediate of the available focal length range, i.e., the available zooming range. In addition, in view of the necessity of the use of the two aperture-indicating indicia, it often occurs in great possibility that one of the two indicia might be inadvertently taken for the other of the indicia, resulting in the incorrect diaphragm aperture setting.

When it comes to the camera system utilizing an automatic flash unit of a type so designed as to enable the guide number for a given film speed to be manually adjustable by presetting an F-stop number to the aperture scale on the flash unit, there is a possibility that, unless the F-stop number is correctly preset to the aperture scale with due regard paid to the possible change in aperture setting in the lens assembly as a result of the zooming, the amount of flash light emitted from the flash unit may be controlled on the erroneous information to such an extent as to result in the improper exposure.

In addition, in a certain type of camera wherein the transmission of information of the smallest available F-stop number from an interchangeable lens assembly to the camera body is required when and so long as the lens assembly has been mounted on the camera body, the erroneous exposure setting may occur unless means is provided for transmitting information of the two smallest F-stop numbers available on the non-compensated model according to the focal length setting.

A similar erroneous exposure setting may occur when the focal length of the non-compensated model is adjusted to the shortest value after an AE lock has been effected at the longest focal length setting to memorize a particular diaphragm aperture setting at such longest focal length. This technique is known as a substitute for the center-weighted light measurement, taking advantage of the smallest angle of view the zoom lens assembly can achieve at the longest focal length setting. However, the diaphragm aperture setting once locked or memorized at the longest focal length setting does not remain the same when and after the focal length has been adjusted from the longest setting towards the smallest because of inherent change occurring in the lens speed of the non-compensated type with change in focal length.

II. COMPENSATED MODEL

Merits: The compensated type of the variable speed zoom lens assembly is substantially free from the demerits inherent in the non-compensated model and has a good consistency with the camera system.

Demerits: In designing the optical system of any zoom lens assembly of the variable speed type, the aperture ration thereof at a given diaphragm aperture setting is practically meant to be that attained when the focal length is adjusted to the longest setting and, accordingly, as hereinbefore briefly mentioned, for a given diaphragm aperture setting, the zoom lens assembly is lower at the longest focal length than at the shortest focal length. Therefore, in the manufacture of the compensated model wherein the previously described compensating means is incorporated to avoid the change of the lens speed which would result from change in focal length, the employment of unnecessarily large lens elements for the given smallest F-stop number is necessitated if the compensated model which is reasonably and competitively fast at the smallest focal length setting is desired. This means that not only does the resultant lens assembly become bulky and heavy, but also it cannot make the most of the size-increased lens elements. This is because, if it is desired to manufacture the compensated model reasonably and competitively fast at the smallest focal length setting for a given F-stop number, for example, the smallest available F-stop number. The aperture ratio at the longest focal length, which aperture ratio is known as a quotient of the effective aperture divided by the focal length, must be of a relatively small value and this is generally accomplished by the employment of the relatively large-sized lens elements.

The use of the relatively large-sized lens elements in turn results in the increased difficulty in designing the optical system as a whole and tend to constitute a cause of the reduced image forming performance of the resultant lens assembly. One may consider the possibility of designing the smallest F-stop number available at the longest focal length setting to be determined depending on that available at the shortest focal length setting, rather than to design the smallest F-stop number at the shortest focal length setting to be determined on that at the longest focal length setting. However, this is extremely difficult as a matter of practice in view of the previously described increased design difficulty and the extent of possible reduction in optical performance resulting from design errors. (The error sensitivity, which means the extent to which the optical aberrations, the lens-back and/or the focal length vary for a given error, is, in the case of a zoom lens assembly, apt to be higher at the longest focal length setting than at the short focal length setting range and to increase with increase of the size of the lens elements.)

As hereinbefore discussed, the compensated and non-compensated models of the zoom lens assemblies are compatible with each other in the sense that the demerits of one mode are compensated for by the other model, and vice versa.

SUMMARY OF THE INVENTION

Accordingly, this invention has been developed with a view to minimizing the embarrassment a camera hobbist has hitherto suffered in making a decision of what model of zoom lens assembly to purchase and is intended to provide a unique zoom lens assembly which can be used as compensated and non-compensated models one at a time without sacrificing the maximum available optical performance and without the required use of lens elements of substantially increased size.

According to this invention, the zoom lens assembly is provided with a manipulatable change-over mechanism for bringing the lens assembly selectively into one of the two modes, namely, compensated and non-compensated modes: the lens assembly in the compensated mode function in a manner similar to the previously discussed compensated model, and the same lens assembly in the non-compensated mode in a manner similar to the previously discussed non-compensated model.

The zoom lens assembly having the above-described dual function is believed to have a great significance in its existence as it may appeal to amateur and professional camera lovers, who have long been embarrassed with a diversity of choices of lens assemblies in addition to a diversity of makes of cameras available.

BRIEF DESCRIPTION OF THE DRAWINGS

These and other objects and features of this invention will readily be understood from the following description taken in conjunction with preferred embodiments thereof with reference to the accompanying drawings, in which:

FIG. 7 is a view similar to FIG. 5, showing the lens assembly according to a third embodiment of this invention;

FIGS. 11(a) to 11(e) are schematic diagrams showing the sequence of operation of a safety mechanism used in the lens assembly of FIG. 10;

DETAILED DESCRIPTION OF EMBODIMENTS

Figure 1:
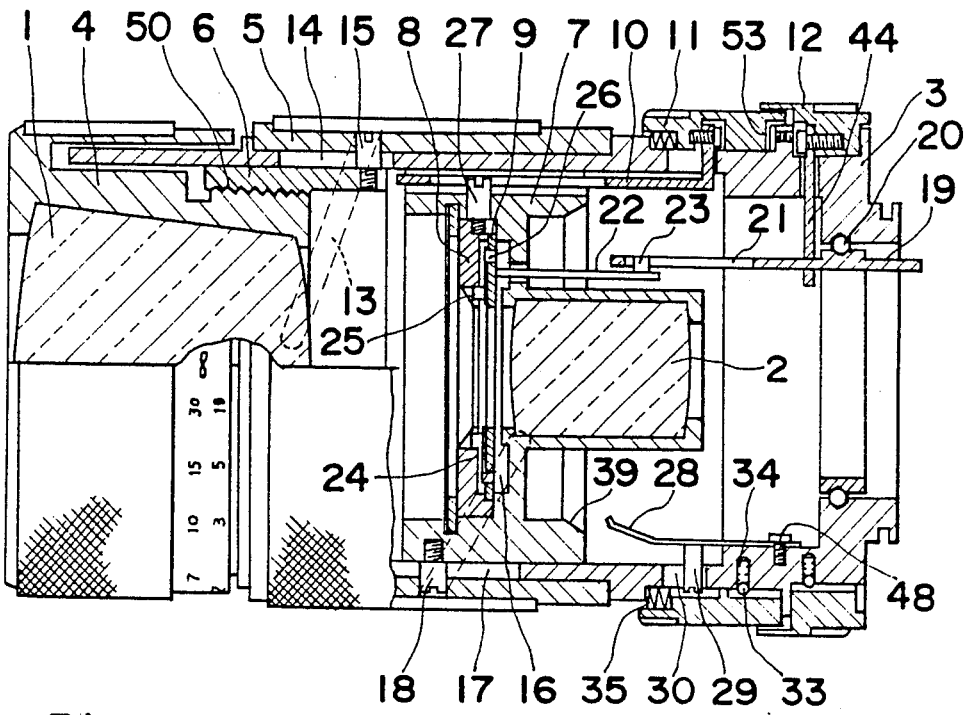
FIG. 1 is a longitudinal sectional view showing a zoom lens assembly according to a first embodiment of this invention with its focal length set to the longest value.

FIGS. 1 to 4 illustrate a zoom lens assembly according to a first embodiment of this invention. Referring to FIGS. 1 to 4, the lens assembly shown particularly in FIGS. 1 and 2 comprises its optical system including, for example, a front lens group 1 and a rear lens group 2, and a diaphragm mechanism movable together with the rear lens group 2 in a direction parallel to the optical axis of the system, the diaphragm mechanism being comprised of a ring-shaped diaphragm holder 8 and a diaphragm operating ring 9. The lens assembly also comprises a zooming ring 5 supported for rotation about the optical axis for the adjustment of the focal length of the lens assembly, a diaphragm aperture adjusting ring 12 operatively coupled to the diaphragm mechanism and mounted for rotation about the optical axis, and a change-over ring 11 mounted for rotation through a limited angle about the optical axis and positioned between the rings 5 and 12 in front of the ring 12, i.e., with respect to the direction in which the lens assembly mounted at its right-hand end to a camera body (not shown) is aimed at a target object to be photographed.

Figure 3:
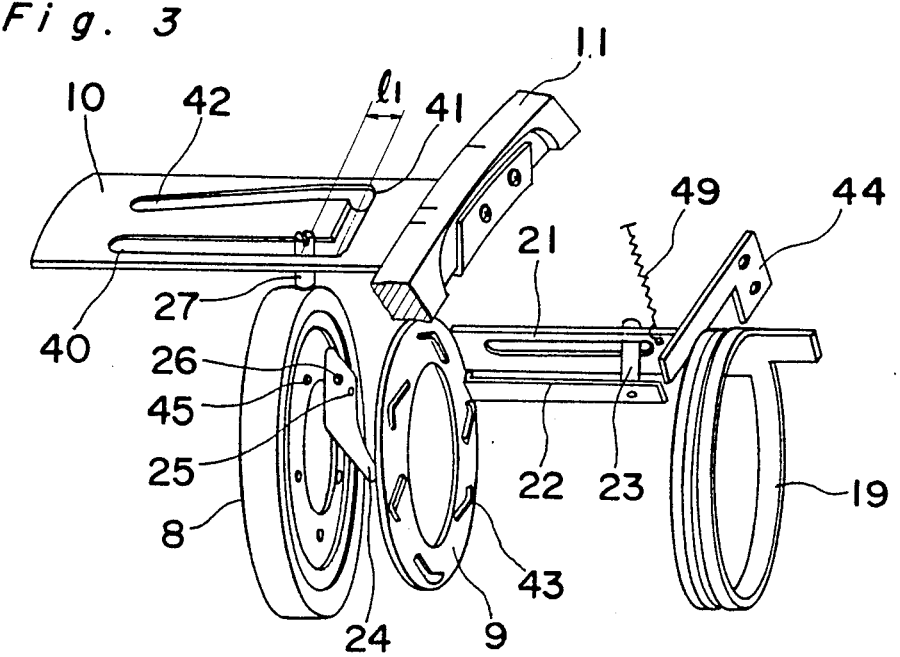
FIG. 3 is a perspective view showing a manipulatable change-over mechanism used in the lens assembly of FIGS. 1 and 2.

In addition to the diaphragm holder 8 and the diaphragm operating ring 9, the diaphragm mechanism is also comprised of, as best shown in FIG. 3, a plurality of diaphragm blades, only one of which is shown by 24, the blades 24 being so arranged and so supported in a manner known to those skilled in the art that, when the diaphragm operating ring 9 is rotated about the optical axis relative to the diaphragm holder 8, the aperture defined by the blades 24 in coaxial relation to the optical axis can be narrowed and widened one at a time depending on the direction of the relative rotation. It should be noted, however, that, the diaphragm holder 8 can also be rotatable relative to the diaphragm operating ring 9 for the purpose of this invention. The aperture adjusting ring 12 has a lever 44 rigidly secured thereto and extending generally radially inwardly for engagement with an aperture preset ring 19, whereby when the ring 12 is rotated, the rotation of the ring 12 can be transmitted to the diaphragm operating ring 9 through the engagement between a linear groove 21, defined in an axial arm extending axially from the preset ring 19, and a pin 23 received in the linear groove 21 and rigidly secured to the operating ring 9 through an axial lever 22 parallel to the axial arm of the preset ring 19. Thus, it will be readily be seen that, by rotating the aperture adjusting ring 12 to any one of the positions of aperture reading, that is, the F-stop numbers, the diaphragm aperture defined by the blades 24 can be adjusted to a diameter appropriate to the selected F-stop number to which the aperture adjusting ring 12 has been rotated. While the diaphragm mechanism can move together with the rear lens group 2 in a direction axially of the optical system during the zooming with the zooming ring 5 rotated because it is integrally mounted with the rear lens group 2, the rotation of the zooming ring 5 does not result in any angular displacement of the operating ring 9 because the linear groove 21 extends in parallel relation to the optical axis of the lens assembly.

The diaphragm holder 8 has a pin 27 rigidly mounted thereon and extending radially outwardly therefrom for engagement into a continuous guide groove of a generally U-shaped configuration defined in a cam plate 10 rigidly connected to the change-over ring 11, the continuous guide groove being comprised of an axially-extending guide groove portion 40 which extends in parallel relation to the optical axis, a cam groove portion 42 which extends diagonally frontwardly so as to converge with the axial guide groove portion 40 at a point away from the ring 11, and a connecting groove portion 41 located adjacent to the ring 11 and having its opposite ends communicated to the guide and cam groove portions 40 and 42, respectively. In FIG. 3 the pin 27 is shown as engaged in the axial guide groove portion 40 of the continuous guide groove in the cam plate 10 and, in this condition, the diaphragm holder 8 does not undergo any rotation about the optical axis even though the diaphragm mechanism, including the previously described elements 8, 9 and 24, is axially moved as a result of the rotation of the zooming ring 5 during the zooming operation. Thus, so long as the pin 27 is engaged in and guided by the axial guide groove portion 40, the zooming operation does not result in the adjustment of the diaphragm aperture and this means that, for a given diaphragm aperture setting, that is, wherever the aperture adjusting ring 12 is positioned, the lens speed, that is, the aperture ratio of the lens assembly can vary with change in focal length. It is, however, to be noted that the linkage between the holder 8 and the operating ring 9 is so designed as to render the diaphragm aperture at a maximum when the aperture adjusting ring 12 is set or positioned to the smallest available F-stop number.

FIG. 3 illustrates the condition which is attained when the zooming ring 5 has been moved to the shortest focal length position. Starting from this condition, and when the change-over ring 11 is pulled axially frontwardly, or leftwards as viewed in FIGS. 1 to 3, against a compression spring 35 to move the cam plate 10 a predetermined distance shown by 1, in FIG. 3, the pin 27 which has been situated within the axial guide groove portion 40 is brought into alignment with the connecting groove portion 41, the subsequent rotation of the change-over ring 11 from a non-compensated position to a compensated position resulting in the entry of the pin 27 into the cam groove portion 42 through the connecting groove portion 41. When an external pulling force applied to the change-over ring 11 is released therefrom after the ring 11 has been moved to the compensated position about the optical axis with the pin 27 having consequently brought into engagement in the cam groove portion 42, the subsequent zooming operation, that is, the subsequent rotation of the zooming ring 5, results in the angular movement of the diaphragm holder 8 about the optical axis relative to the operating ring 9 as the pin 27 is guided in and along the cam portion 42 in a direction away from the connecting groove portion 41. The result is that the diaphragm aperture defined by the blades 24 varies in a direction required to compensate for a change in aperture ratio resulting from the change in the focal length. This is possible because, as the zooming ring 11 is rotated from the shortest focal length position towards the longest focal length position while the aperture adusting ring 12 is set at a given F-stop number, for example, the smallest F-stop number, the diaphragm mechanism moves axially frontwardly in such a manner that, while the operating ring 9 is moved axially with the pin 23 guided in and along the linear groove 21, the diaphragm holder 8 undergoes axial and rotary motion with the pin 27 guided in and along the cam groove portion 42 of the groove in the cam plate 10.

Figure 5:
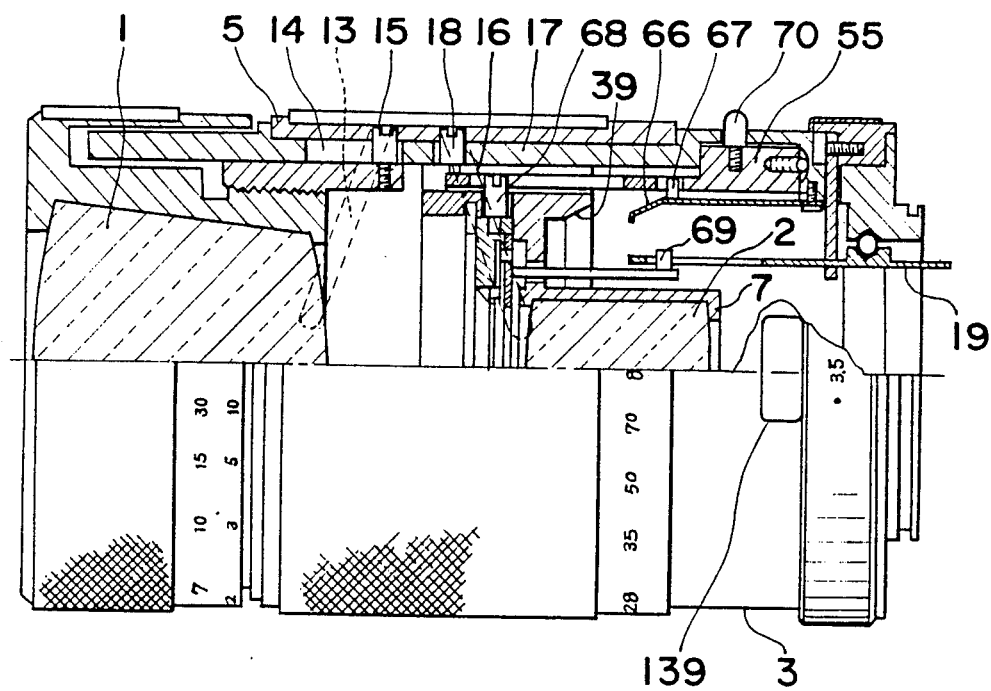
FIG. 5 is a longitudinal side view, with a portion broken away, showing the lens assembly according to a second embodiment of this invention.
Figure 6:
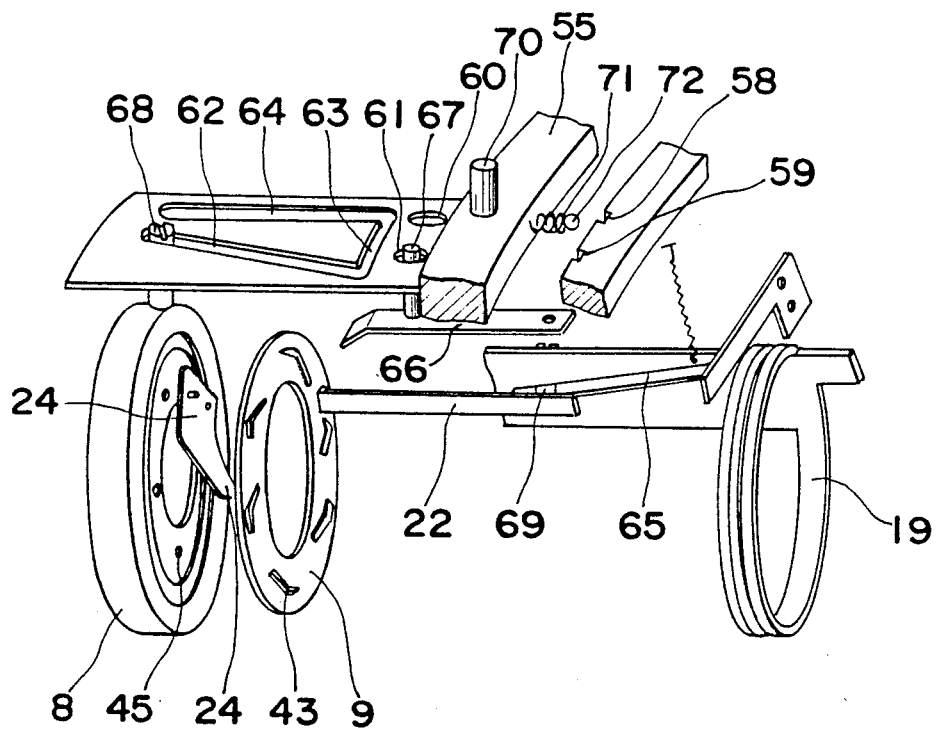
FIG. 6 is a view similar to FIG. 3, showing the change-over mechanism used in the lens assembly of FIG. 5.

FIGS. 5 and 6 pertain to a second embodiment of this invention which will now be described in connection with what makes this second embodiment differ from the preceding embodiment. Comparing FIG. 6 with FIG. 3, it will readily be seen that cam and axial guide groove portions 62 and 64, both shown in FIG. 6, take the position of axial guide and cam groove portions 40 and 42, respectively. In addition, the arrangement has been made such that, during the zooming operation, the diaphragm mechanism as a whole can undergo axial and rotary motion with respect to the optical axis with no relative rotation taking place between the diaphragm holder 8 and the operating ring 9 and, consequently, without the diaphragm aperture being varied. This is true when and so long as a pin 68 (which functionally corresponds to the pin 27 shown in FIG. 3) is engaged in the cam groove portion 62. However, when and after the pin 68 has been brought into engagement in the axial guide groove portion 64 (which functionally corresponds to the cam groove portion 42 shown in FIG. 3), and when the zooming operation is subsequently initiated, the diaphragm holder 8 does not rotate, but the operating ring 9 rotates and, accordingly, the diaphragm aperture changes in a manner so as to compensate for the change in aperture ratio resulting from the change in focal length.

Figure 8:
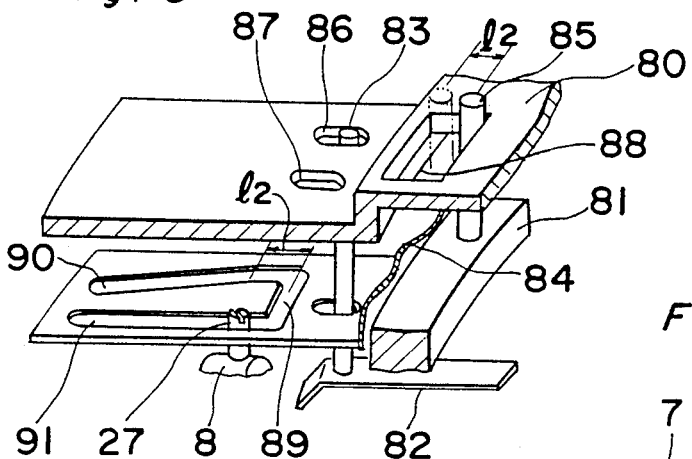
FIG. 8 is a perspective view showing the change-over mechanism used in the lens assemmbly of FIG. 7.
Figure 9:
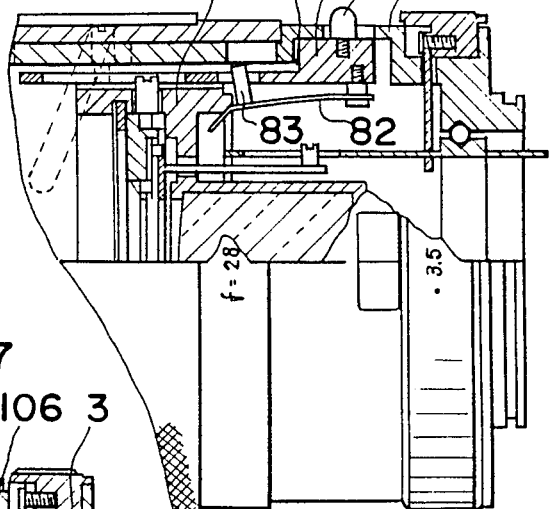
FIG. 9 is a view similar to FIG. 7, showing a portion of the lens assembly of FIG. 7 with the focal length set to the smallest value.

FIGS. 7, 8 and 9 pertain to a third embodiment of this invention. While the lens assembly according to the embodiment shown in FIGS. 7 to 9 is basically identical with that according to the embodiment shown in FIGS. 1 to 4, this third embodiment is directed to an improvement in a lock mechanism. In general, in any one of the foregoing embodiments, the change-over of the zoom lens assembly from one of the compensated and non-compensated modes into the other of these modes can be effected when the zooming ring has been rotated to the shortest focal length position. While the lens assembly in any one of the foregoing embodiments employs a click-stop mechanism operable to avoid any unnecessary or accidental change-over of the modes, the lens assembly in this third embodiment shown in FIGS. 7 to 9 employs a lock pin 83.

As best shown in FIGS. 7 and 8, the lock pin 83 is carried by a change-over ring 81 (which functionally corresponds to the change-over ring 11 shown in FIGS. 1 to 4) through an elongated leaf spring 82 and has its free end normally engaged in one of the lock holes 86 and 87 defined in a portion of a fixed barrel 80 thereby to prevent the change-over ring 81 from being accidentally or unnecessarily rotated and, hence, to lock the lens assembly in one of the compensated and non-compensated modes. In this condition, the mode change-over of the lens assembly cannot be effected. However, when the zooming ring is rotated to the shortest focal length position with the rear lens group consequently moving rightwards as viewed in FIG. 7, a tapered area 39 at the righthand, rear end of a movable lens mount 7 for the rear lens group is brought into engagement with the leaf spring 82 ready to depress the latter downwards as viewed in FIG. 7. While the turn of the change-over ring 81 about the optical axis after the lock pin 83 has disengaged from the one of the lock holes 86 and 87 results in the change-over of the lens assembly from the one of the compensated and non-compensated modes to the other of the compensated and non-compensated modes, this can be accomplished by pulling a change-over pin 85 on the change-over ring 81 in a direction leftwards, as viewed in FIG. 7, to displace the leaf spring 82 together with the change-over ring 81 in a direction leftwards against a compression spring 84 so that the free end of the leaf spring 82 can be forced to displace downwards, as viewed in FIG. 7, against its own resiliency in sliding contact with the tapered area 39 with the free end of the lock pin 83 consequently disengaged from the one of the lock holes 86 and 87 as best shown in FIG. 9, thereby conditioning the lens assembly ready to be switched over from the one of the compensated and non-compensated modes. The actual change-over will be described in detail later.

Figure 10:
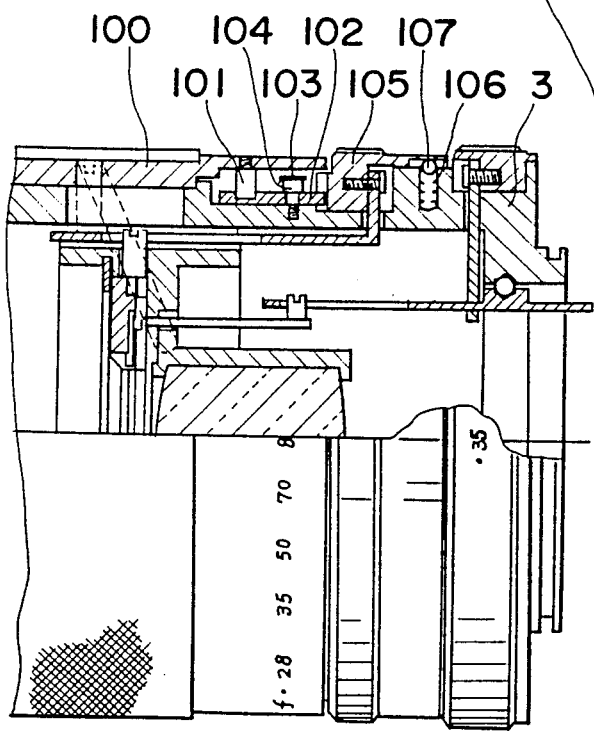
FIG. 10 is a view similar to FIG. 9, showing the lens assembly according to a fourth embodiment of this invention.

The fourth embodiment of this invention shown in FIGS. 10 and 11 is similar to the foregoing embodiment shown in FIGS. 7 to 9 in that it pertains to the lock mechanism, but in a modified form.

FIG. 12, FIG. 13 and FIGS. 14 and 15 pertain, respectively, to fifth, sixth and seventh embodiments of this invention, which will be described later in detail.

FIGS. 17 to 24 illustrate different embodiments of aperture-indicating markings provided on the zoom lens assembly according to this invention. While the aperture-indicating may be a simple aperture-indicating indicium, for example, either a line or a dot, so far as any one of the fixed speed type and the compensated model is concerned, the zoom lens assembly having the capability of functioning as the compensated and non-compensated models such as according to this invention must have two or more aperture-indicating indicia to be used one at a time according to the mode to which the lens assembly has been selected. For this purpose, the embodiments shown in FIGS. 17 to 24 are provided, the details of which will be set forth later.

Figure 26:
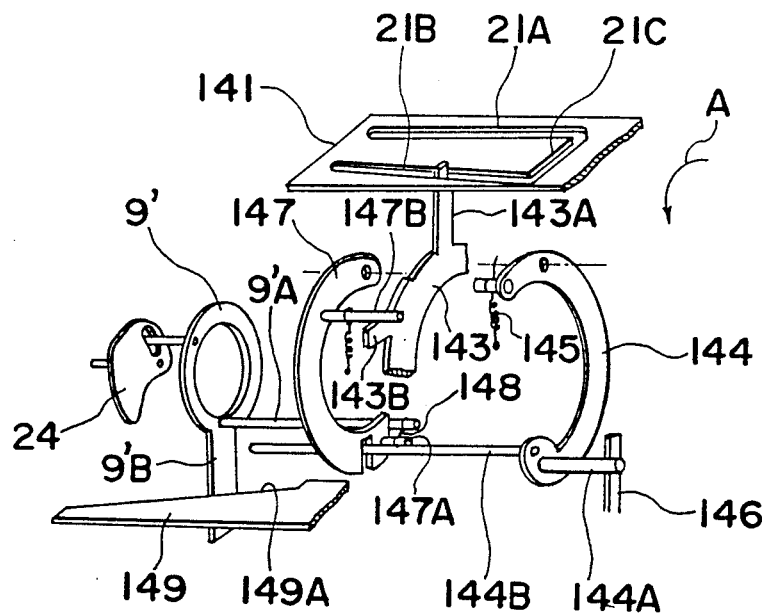
FIG. 26 is a perspective view showing the change-over mechanism according to an eighth embodiment of this invention.
Figure 27:
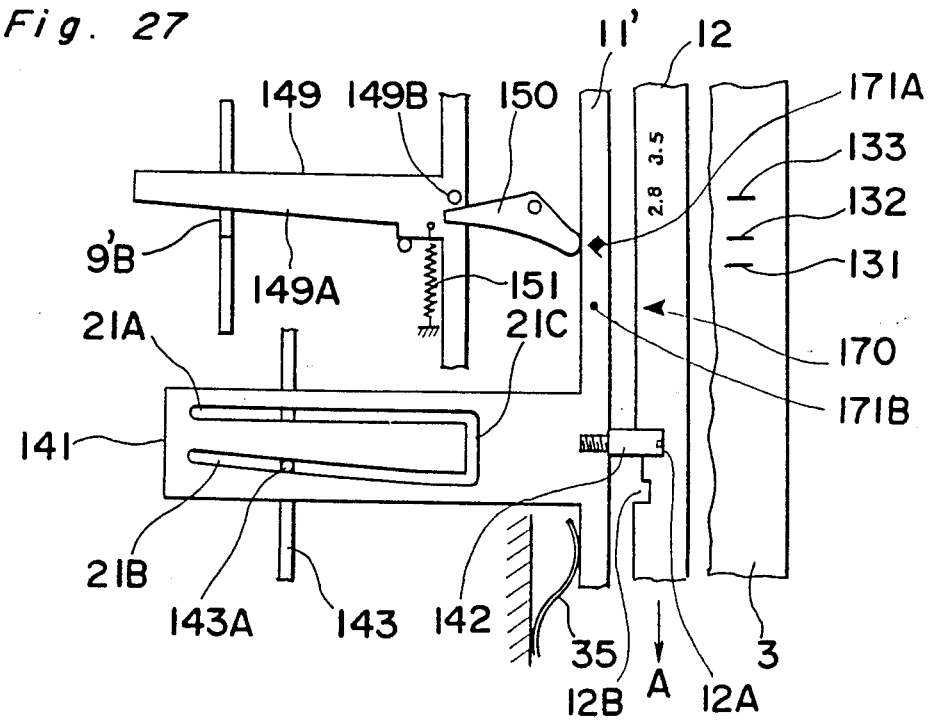
FIG. 27 is a schematic top plan view of the change-over mechanism of FIG. 26.
Figure 28:
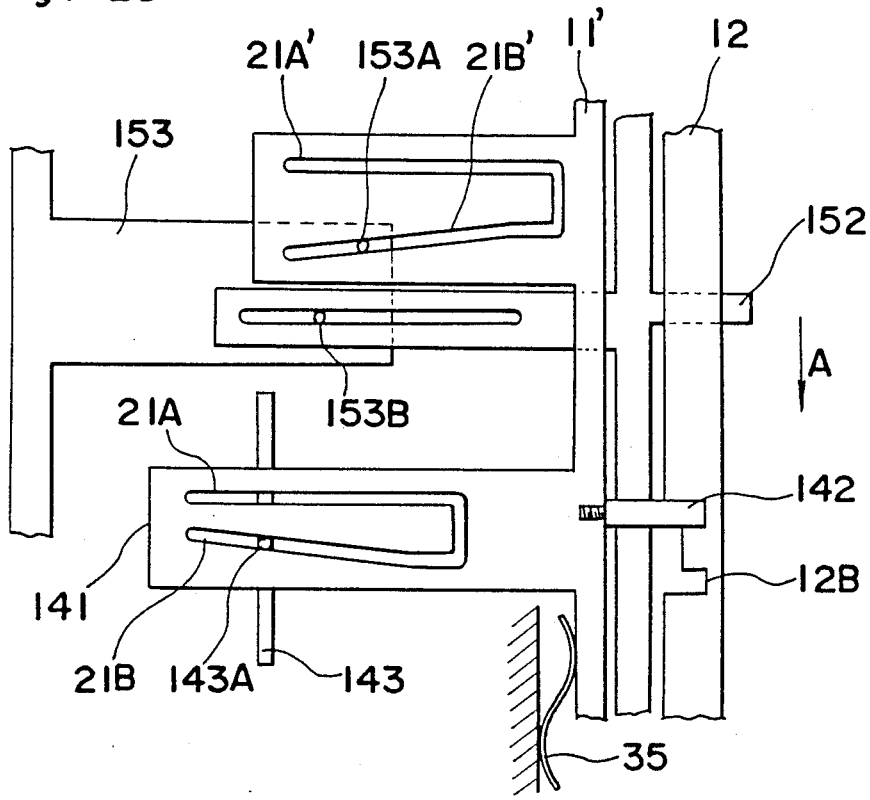
FIG. 28 is a view similar to FIG. 27, showing the change-over mechanism according to a ninth embodiment of this invention.
Figure 29:
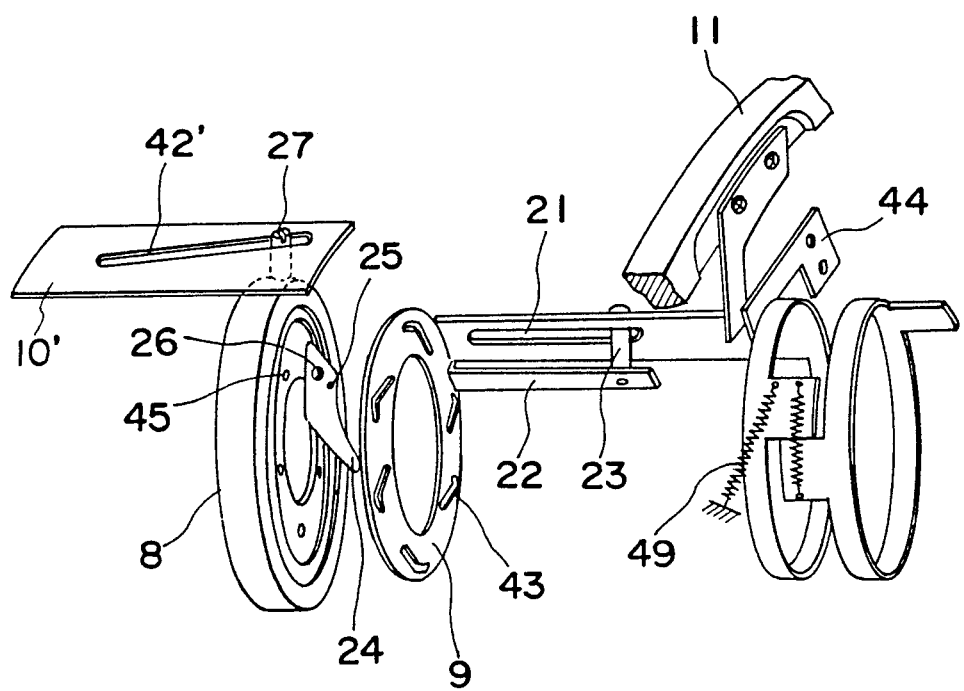
FIG. 29 is a view similar to FIG. 26, showing a modified form of the change-over mechanism included within the scope of this invention.

FIGS. 26 and 27 illustrate different forms of application of this invention to lens assemblies having different types of diaphragm mechanisms, respectively, and FIGS. 28 and 29 illustrate other embodiments of this invention, reference to all of which will be made later.

While the various embodiments of this invention have been described briefly in the foregoing description, the details thereof including the embodiments not mentioned in the foregoing description will now be described.

FIRST EMBODIMENT (FIGS. 1 TO 4)

Referring to FIGS. 1 to 4, the zooming operation (the focal length setting), the focusing operation (the distance setting) and the diaphragm aperture setting of the zoom lens assembly will be described. The zoom lens assembly shown in this embodiment has a two-component optical system including the front and rear lens groups 1 and 2 which are supported for movement in predetermined directions upon rotation of the zooming ring 5. Particularly, during the zooming operation, the movement of the front lens group 1 is effected by the utilization of a diagonal cam groove 13 defined in the zooming ring 5, an axial guide groove 14 defined in a fixed barrel 3, and a guide pin 15, and the movement of the rear lens group 2 is effected by the utilization of a diagonal cam groove 16 defined in the zooming ring 5, an axial guide groove 17 defined in the fixed barrel 3, and a guide pin 18. The focusing operation can be done by rotating a focusing ring 4 to move the front lens group guided by a helicoid thread 50 defined in a movable lens mount 6 for the front lens group 1. The diaphragm mechanism including the diaphragm blades can be moved together with the movable lens mount 7 for the rear lens group 2 in a direction parallel to the optical axis.

The diaphragm aperture setting will now be described. The diaphragm blades 24 have respective pairs of rivets 25 and 26 rigidly mounted thereon in spaced relation, the rivets 26 being engaged in respective cam slots 43 defined in the diaphragm operating ring 9, while the rivets 25 are pivotally received in respective bearing holes 45 in the diaphragm holder 8. The pin 27 rigidly mounted on the diaphragm holder 8 and extending radially outwardly therefrom is engaged in the continuous guide groove including the guide, connecting and cam portions 41, 42 and 43 and defined in the cam plate 10 fast or integral with the change-over ring 11. On the other hand, the pin 23 rigidly mounted on the axial lever 22 fast or integral with with operating ring 9 is engaged in the linear groove 21 in the preset ring 19. The preset ring 19 is normally biased by a coil spring 49 in a direction counterclockwise as viewed in the direction in which the lens assembly is aimed (at the target object to be photographed), with the diaphragm blades 24 consequently stopped down to the smallest available aperture, that is, the greatest available F-stop number while the rotation of the preset ring 19 is restricted by the lever 44 fast with the aperture adjusting ring 12. It is to be noted that, when the aperture adjusting ring 12 is rotated about the optical axis in a direction counterclockwise as viewed in the direction in which the lens assembly is aimed (at the target object), the lever 44 moves angularly together with the adjusting ring 12 and the preset ring 19 rotates as pulled by the coil spring 49 in pursuit of and after the lever 44, the rotation of the preset ring 19 being consequently transmitted to the operating ring 9 through the arm of the ring 19, then the pin 23 and, finally, the axial lever 22, whereby the diaphragm blades 24 can be stopped down towards the smallest available aperture with the rivets 26 guided in and along the respective cam slots 43.

Figure 16:
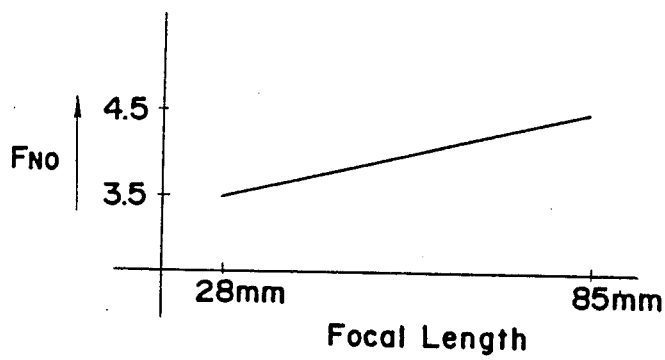
FIG. 16 is a graph showing the relationship between the focal length setting and the aperture reading, i.e., F-stop numbers.

Hereinafter, the manner of change of the diaphragm aperture defined by the diaphragm blades 24 as a result of the zooming operation will be described. As hereinbefore described, the diaphragm mechanism, including the blades 24, the holder 8 and the operating ring 9, can be axially moved together with the rear lens group when the zooming operation is initiated. So long as the pin 27 on the holder 8 is engaged in the axial guide groove portion 40 of the continuous guide groove of generally U-shaped configuration in the cam plate 10, the cam holder 8 does not undergo rotary motion about the optical axis during the axial movement of the diaphragm mechanism as a whole. Similarly, even the operating ring 9 does not undergo rotary motion about the optical axis, but moves axially with the pin 23 guided in and along the linear groove 21 in the preset ring during the zooming operation. Thus, so long as the pin 27 is engaged in the guide portion 40 as shown in FIG. 3, the lens assembly is held in the non-compensated mode in which the diaphragm aperture defined by the diaphragm blades 24 does not vary, that is, the aperture ratio of the lens assembly at any diaphragm aperture setting can vary with change in focal length. Given the 28–85 mm, f/3.5–4.5 zoom lens assembly, the smallest aperture ratio of 3.5 available at the shortest focal length setting of 28 mm varies to the aperture ratio of 4.5 when the focal length is adjusted to the longest setting of 85 mm in a manner as shown in the graph of FIG. 16, so long as the pin 27 is engaged in the axial guide groove portion 40, that is, the lens assembly is held in the non-compensated mode.

However, when the zooming operation is effected while the pin 27 is engaged in the cam groove portion 42, the diaphram holder 8 undergoes not only axial motion, but also rotary motion about the optical axis because of the shape of the cam groove portion 42 while the operating ring 9, though moved axially together with the diaphragm holder 8, does not rotate about the optical axis. In this condition, the diaphragm aperture defined by the diaphragm blades 24 varies with change in focal length and the lens assembly is therefore in the compensated mode.

Figure 4:
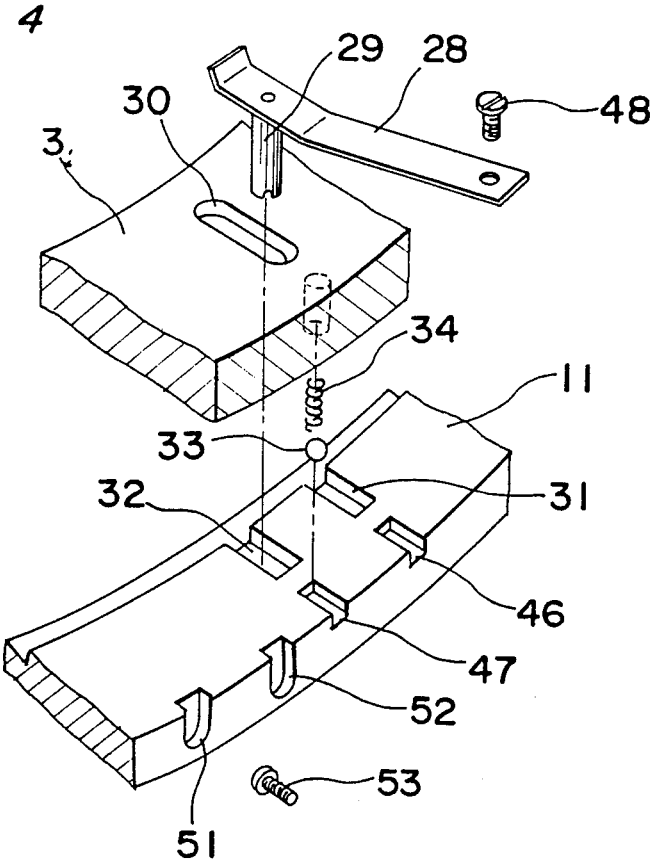
FIG. 4 is a perspective view, on an enlarged scale, showing a detent arrangement operatively associated with the change-over mechanism of FIG. 3.

The change-over mechanism necessary for bringing the lens assembly selectively from one of the compensated and non-compensated modes into the other of the compensated and non-compensated modes at the will of the user will now be described. The change-over mechanism including the change-over ring 11 also includes a click-stop device for avoiding an unnecessary rotation of the change-over ring 11 during the zooming operation. The click-stop device is constituted by, as best shown in FIG. 4, a pair of spaced lock recesses 51 and 52, a pair of spaced lock recesses 31 and 32, and a pair of spaced click recesses 46 and 47. The pair of lock recesses 31 and 32 are utilized to permit the rotation of the change-over ring 11 only when the zooming ring 5 is set to the shortest focal length position so that the diaphragm holder 8 will not be unnecessarily displaced angularly about the optical axis during the zooming operation. More specifically, the fixed barrel 3 has a leaf spring 28 secured at one end thereto by means of a set screw 48 and also has defined therein a slot 30 slightly wider than the diameter of a lock pin 29 carried by the leaf spring 28. When and so long as the rear movable lens mount 7 for the rear lens group 2 is held at a position corresponding to the longest focal length setting as shown in FIG. 1, the lock pin 29 extending loosely through the slot 30 in the fixed barrel 3 is engaged in one of the lock recesses 31 and 32 both defined in the change-over ring 11 to avoid unnecessary or premature rotation of the change-over ring 11. Where the lens assembly is in the compensated mode, the lock pin 29 is engaged in the lock recess 31, but where it is in the non-compensated mode, the lock pin 29 is engaged in the lock recess 32.

Figure 2:
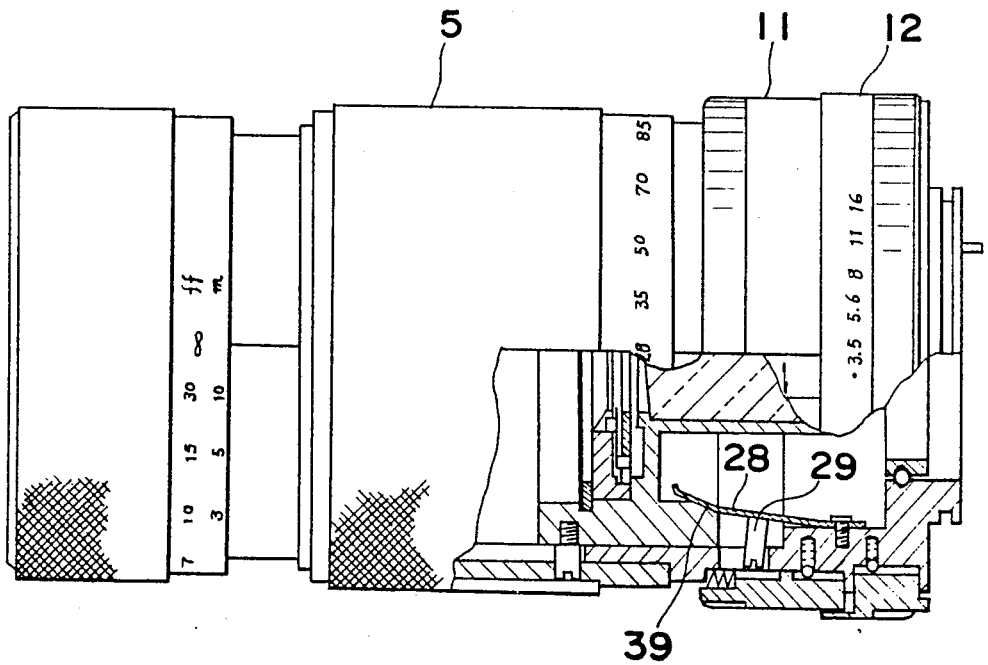
FIG. 2 is a longitudinal side view, with a portion broken away, showing the lens assembly of FIG. 1 with the focal length set in a wide-angle range.

However, when and after the rear movable lens mount 7 has been moved to the opposite position corresponding to the shortest focal length setting as a result of the rotation of the zooming ring 5 as shown in FIG. 2, the tapered area 39 at the rear end of the rear movable lens mount 7 is brought into contact with the free end of the leaf spring 28 thereby upwardly, as viewed in FIG. 2, or radially inwardly, shifting the free end of the leaf spring 28 against it own resiliency to disengage the lock pin 29 from the lock recess in the change-over ring 11. It is, however, to be noted that any accidental or premature rotation of the change-over ring 11 should not occur even when the zooming ring is set to the shortest focal length position. For this purpose, the lock recesses 51 and 52 are provided for engagement with a lock screw 53 rigidly threaded to the fixed barrel 3. In order to release this lock, the change-over ring 11 has to be pulled the predetermined distance, shown by $l_1$, in FIG. 3, in the frontward direction against the compression spring 35 and then to be rotated until a detent ball 33 is seated in one of the click recesses 46 and 47. By so doing, the mode change-over is completed. The purpose of the provision of the click recesses 46 and 47 is to make the mode positions for the change-over ring 11 clear, and if a biasing spring 34 for the detent ball 33 is employed in the form as capable of exerting a relatively great biasing force, the lock recesses 51 and 52 as well as the lock screw 53 may not be always necessary and can be omitted.

SECOND EMBODIMENT (FIGS. 5 AND 6)

The lens assembly according to the second embodiment shown in FIGS. 5 and 6 is similar to that according to the first embodiment, but has been improved to enable the mode change-over to be carried out by manipulating a change-over knob 70 in the form of a pin rigidly mounted on and extending radially outwardly from a change-over ring 55, and also to simplify the structure by forming lock holes in the change-over ring 55 and a slant guide groove 65 in an axially extending arm of the preset ring 19. In FIGS. 5 an 6 the lens groups are shown as positioned corresponding to the longest focal length setting. When the zooming ring 5 is rotated, the front lens group 1 is axially moved in the leftward direction, that is, in a direction opposite to the film (not shown) in the camera body, by the utilization of the cam groove 13, the axial guide groove 14 and the guide pin 15 while the rear lens group 2 is moved axially inthe rightward direction, i.e., in the direction towards the film, by the utilization of the cam groove 16, the axial guide groove 17 and the guide pin 18, thereby setting the focal length of the lens assembly in the wide angle range. As a matter of course, the rear movable lens mount 7 is moved together with the rear lens group 2 during the zooming operation. When the rear movable lens mount 7 is subsequently moved righwards towards a position corresponding to the short focal length setting, the tapered area 39 at the rear end of the rear movable lens mount 7 is brought into contact with the bent free end of a leaf spring 66. However, at the moment the rear movable lens mount 7 arrives at such position, the free end of the leaf spring 66 is radially inwardly displaced against its own resiliency in sliding contact with the tapered area 39 of the rear movable lens mount 7 to allow a lock pin 67, rigidly mounted on the leaf spring 66, to disengage from one of the lock holes 60 and 61 defined in the change-over ring 55 so that the subsequent manipulation of the change-over pin 70 so as to turn the change-over ring 55 about the optical axis can result in the mode change-over of the lens assembly.

In addition, in the second embodiment shown, an arrangement is made such that, when and so long as the pin 68 fast with the diaphragm holder 8 is engaged in the cam groove portion 62, the zooming operation does not result in any movement of the diaphragm blades 24 and, therefore, the lens assembly is held in the non-compensated mode. In order to set the lens assembly in the compensated mode, it is necessary to turn the change-over pin 70 through a predetermined angular distance about the optical axis in a counterclockwise direction with respect to the aiming direction, i.e., the direction in which the lens assembly is aimed at the target object, while the lock pin 67 has been disengaged from the lock hole 61 at the shortest focal length setting. As the lock pin 67 is turned in this way, the pin 68 on the diaphragm holder 8 is guided in and along a connecting groove portion 63 towards the axial guide groove portion 64.

When the zooming operation is subsequently effected after the pin 68 has been aligned with the cam groove portion 64, the diaphragm holder 8, while moving axially does not rotate, but the operating ring 9 is rotated a predetermined angle about the optical axis during its axial movement together with the diaphragm holder 8. This is possible because a pin 69 rigidly carried by the operating ring 9 through the axial lever 22 is guided in and along the slant guide groove 65 defined in the arm of the preset ring 19. Accordingly, it is clear that, during the zooming operation, while the pin 68 is guided in the axial guide groove portion 64, the diaphragm blades 24 undergo movement to adjust the diaphragm aperture defined thereby with the lens assembly consequently held in the compensated mode. It is to be noted that a biasing spring 71, a detent ball 72 and click recesses 58 and 59 are all provided for preventing the movement from occurring unnecessarily during the mode change-over with the zooming ring set at the shortest focal length position.

THIRD EMBODIMENT (FIGS. 7 TO 9)

In any one of the foregoing embodiments, the release of the change-over ring from a locked condition has been automatically performed by the utilization of the tapered area 39 of the rear movable lens mount 7 when and so long as the zooming ring has been rotated to both of the smallest and longest focal length positions. In such case, the click or lock mechanism is necessitated to avoid unnecessary or accidental movement of the change-over ring at the shortest focal length setting. In addition, since the release from the locked condition is so designed as to take place against the force of the leaf spring, a higher load or resistance tends to be imposed on the rotation of the zooming ring as the latter is rotated towards the smallest focal length position. This problem can be eliminated by the embodiment shown in FIGS. 7 to 9, reference to which will now be made.

Referring first to FIG. 7, the rear movable lens mount 7 is shown as held at a position corresponding to the shortest focal length setting, in which condition the free end of the leaf spring 82 and the tapered area 39 of the lens mount 7 are held in close vicinity with each other. FIG. 9, however, illustrates the condition in which the change-over pin 85 connected with the change-over ring 81 has been manually pulled against the compression or corrugated spring 84 in a direction away from the camera body, i.e., frontwardly of the lens assembly. In this condition shown in FIG. 9, the leaf spring 82 is radially inwardly yielded with its free end slidingly engaged underneath the tapered area 39 of the lens mount 7, and, at the same time, the lock pin 83 fast with the leaf spring 82 has been disengaged from one of the lock holes 86 and 87.

The mode change-over of the zoom lens assembly according to the third embodiment will hereinafter be described with reference to FIG. 8. When the change-over pin 85 is pulled a predetermined distance, shown by $l_2$ in FIG. 8, in the direction away from the camera body or frontwardly of the lens assembly while the zooming ring is held in the shortest focal length position, in lock pin 83 is disengaged from the lock hole 86. Simultaneously therewith, since the change-over ring 81 has been displaced frontwardly a predetermined distance $l_2$ together with the frontward pull of the change-over pin 85, the pin 27 fast with the diaphragm holder 8 is brought in position ready to enter a connecting groove portion 89. When the change-over pin 85 is subsequently turned about the optical axis in the counterclockwise direction with respect to the aiming direction, the pin 27 which has been engaged in an axial guide groove portion 91 moves in and along the connecting groove portion 89 and is then brought in position ready to enter a cam groove portion 90. The release of the pulling force applied to the change-over pin 85 results in that the change-over ring 81 is returned rearwardly by the action of the spring 84 to allow the leaf spring 82 to restore the original shape with the lock pin 83 consequently engaged in the lock hole 87 to avoid unnecessary rotation of the change-over ring 81. It is to be noted that a fixed barrel 80 has an escape scuttle 88 defined therein within the range over which the change-over pin 85 is movable. Since the path of movement of the change-over pin 85 during the change-over operation is generally U-shaped, and if the escape scuttle 88 is so shaped as to be similar to and in alignment with the generally U-shaped path of movement of the change-over pin 85, it is possible to prevent the mode change-over from being performed unless the change-over pin 85 is pulled the distance $l_2$ frontwardly beforehand.

FOURTH EMBODIMENT (FIGS. 10 AND 11)

The fourth embodiment of this invention is directed to modification of the unlocking of a safety mechanism used to avoid unnecessary or accidental change-over of a change-over ring 105. While in the foregoing embodiments an internal movable member such as, for example, the rear lens mount is utilized, it is operatively associated with a zooming ring 100 which is an external operating member, in the embodiment shown in FIGS. 10 and 11. Specifically, while in the foregoing embodiments the mode change-over is possible the shortest focal length setting because the change-over position depends on the position in the direction parallel to the optical axis which corresponds to the zooming movement of the rear movable lens mount 7, the embodiment shown in FIGS. 10 and 11 is such that the mode change-over depends on the operating position of the zooming ring 100, whereby it is possible to design in such a way that the mode change-over can be performed not only at the shortest focal length setting, but also at the longest focal length setting.

Referring now to FIGS. 10 and 11, the zooming ring 100 has a release pin 101 rigidly secured thereto and extending radially inwardly therefrom. The fixed barrel 3 has a stepped bolt 103 rigidly threaded thereto so as to define the point of pivot for a lock lever 102. The lock lever 102 is normally biased counterclockwise by a torsion spring 104. The change-over ring 105 has a pair of spaced lock recesses 109 and 110 defined therein for engagement with the lock lever 102 one at a time for the purpose of avoiding any unnecessary or accidental rotation of the change-over ring 105. The locking and unlocking of the change-over ring 105 performed one at a time by the lock lever 102 will now be described with particular reference to FIG. 11 comprised of FIGS. 11(a) to 11(e).

Referring first to FIG. 11(a), the zooming ring 100 is shown as held at a position other than the shortest focal length position and, in this condition, the release pin 101 fast with the zooming ring 100 is spaced apart from the locking lever 102 while the latter is engaged in the lock recess 109 to lock the change-over ring 105 in a non-rotatable position. When the zooming ring 100 is rotated towards the shortest focal length position and is then passed a slight distance over the shortest focal length position as shown in FIG. 11(c), the release pin 101 associated with the zooming ring 100 contacts the lock lever 102 and causes the lock lever 102 to pivot clockwise against the torsion spring 104, thereby releasing the lock lever 102 from engagement in the lock recess 109. When the change-over ring 105 is rotated clockwise with respect to the aiming direction while the condition of FIG. 11(c) has been established, the lock lever 102 moves away from the lock recess 109 relative to the change-over ring 105. Thereafter, the change-over ring 105 is rotated clockwise with respect to the aiming direction until a detent ball 107 is clicked into a click recess 106, their condition being shown in FIG. 11(d). When the zooming ring 100 is subsequently rotated counterclockwise with respect to the aiming direction to effect the focal length adjustment, the release pin 101 is disengaged from the lock lever 102 and the lock lever 102 is engaged in the lock recess 110, thereby locking the change-over ring 105 in the non-rotatable position to avoid any unnecessary or accidental rotation of the change-over ring 105.

FIFTH AND SIXTH EMBODIMENTS (FIGS. 12 AND 13)

Figure 12:
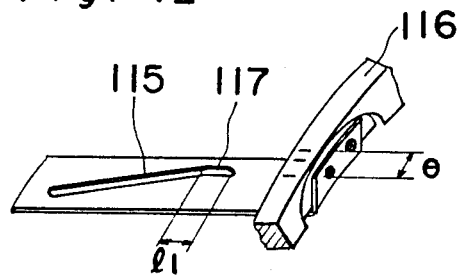
FIG. 12 to FIG. 14 are perspective views of a portion of the change-over mechanism according to fifth, sixth and seventh embodiments of this invention, respectively.
Figure 13:
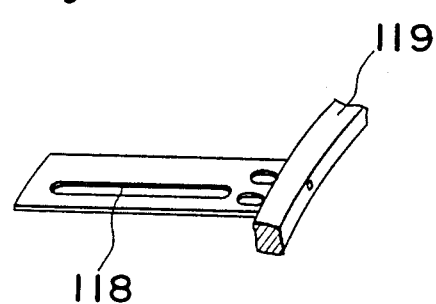

FIG. 12 and FIG. 13 illustrate an essential portion according to the fifth and sixth embodiments of this invention, respectively. The lens assembly according to any one of the foregoing embodiments is of a design wherein, when and so long as it is set in the non-compensated mode, the aperture ratio thereof can continuously vary with change in focal length in the manner as shown in the graph of FIG. 16. The zoom lens assembly according to any one of the embodiments shown in FIGS. 12 and 13 is of such a design that the diaphragm mechanism can be adjusted to give a greater diaphragm aperture, that is, a smaller F-stop number, only at the shortest focal length setting.

Referring to FIG. 12, instead of the use of the cam plate 10 integral with the change-over ring 11, a change-over ring 116 having a slant cam groove 115 and an axial guide groove 117 contiguous to the cam groove 115 is employed. The function of the cam groove 115 is substantially identical with that of the cam groove 42 shown in FIGS. 1 to 4 and is so shaped and so designed that the diaphragm aperture defined by the diaphragm blades can vary with the zooming with the lens assembly consequently held in compensated mode (see the description of the first embodiment.). Since the function of the change-over ring 116 having the slant cam groove 115 is substantially identical with that of the change-over ring 11 shown in FIGS. 1 to 4, description concerning the possibility of adjustment with the change-over ring 116 to increase the diaphragm aperture to a greater diameter only at the shortest focal length setting will now be made with reference to not only FIG. 12 but also FIGS. 1 to 4.

As the zooming ring 5 is rotated towards the smallest focal length position, the rear movable lens mount 7 is moved together with the diaphragm mechanism towards the camera body with the tapered area 39, consequently displacing the leaf spring 28 radially inwardly against the resiliency of the leaf spring 28 as hereinbefore described. With the leaf spring 28 so displaced, the locking of the change-over ring 116 performed by the lock pin 29 is released (FIG. 2). When the change-over ring 116 is pulled the predetermined distance $l_1$ against the spring 35 and then rotated a predetermined angle $\theta$ counterclockwise about the optical axis with respect to the aiming direction, the diaphragm holder 8 is rotated together with the pin 27 to move the diaphragm blades 24 in such a direction as to increase the diaphragm aperture defined thereby. In this way, at the shortest focal length setting, operation is possible to adjust the diaphragm aperture to a greater diameter, that is, to adjust the F-stop number to a smaller reading.

Shown in FIG. 13 is a version in which the change-over ring 55 shown in FIG. 6 is replaced with a change-over ring 119 having an axial guide groove 118 defined therein for engagement with the pin 68 connected to or integral with the diaphragm holder 8. This version is applicable where the groove defined in the arm of the preset ring 19 is constituted by the slant guide groove 65 shown in FIG. 6. The operation necessary to adjust the diaphragm aperture to a greater diameter, i.e., to adjust the F-stop number to a smaller reading, is similar to that described in connection with the embodiment shown in FIG. 12 and, therefore, the description thereof will not be reiterated for the sake of brevity.

SEVENTH EMBODIMENT (FIGS. 14 AND 15)

Figure 14:
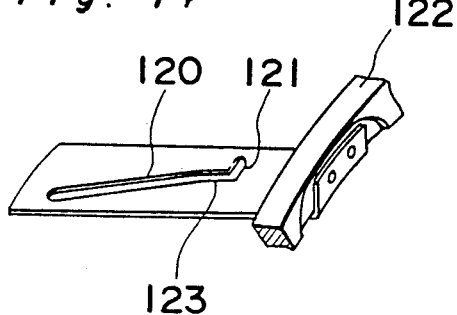

Before the description of the seventh embodiment of this invention proceeds, it is to be noted that reference to the first embodiment shown in and described with reference to FIGS. 1 to 4 should be made so far as component parts of the lens assembly used in this embodiment, but neither shown in nor described with reference to FIGS. 14 and 15. The embodiment of FIGS. 14 and 15 is, however, an improved version of any one of the respective embodiments of FIGS. 12 and 13. More specifically, according to the embodiments shown respectively in FIGS. 12 and 13, although both of these embodiments are effective to provide the zoom lens assembly having a high speed at the maximum diaphragm aperture when and so long as the zooming ring is set to the shortest focal length position, it has been found that a problem might occur when the zooming ring is rotated about the optical axis towards the longest focal length position while the diaphragm aperture is set to a large value, that is, a small F-stop number at the shortest focal length setting. This problem is that, when the zooming ring is so rotated, the diaphragm blades 24 may be unnecessarily moved by the action of the slant cam groove 115 in case of the embodiment of FIG. 12 or the slant guide groove 65 in the preset ring 19 in the case of the embodiment of FIG. 13, in an attempt to increase the diaphragm aperture defined thereby to a diameter greater than that achieved at the shortest focal length setting, but do not attain a desired diaphragm aperture. In addition, there is a possibility in that, as the diaphragm blades 24 are so moved, the peripheral edges of these blades 24 adjacent the circumference of the diaphragm holder 8 may interfere with the circumference of the holder 8 to such an extent that deformation and/or breakage may occur.

Figure 15A:
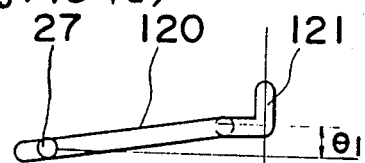
FIGS. 15(a) to 15(d) are schematic diagrams showing the sequence of operation of the change-over mechanism shown in FIG. 14.
Figure 15B:
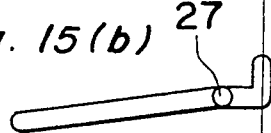
Figure 15C:
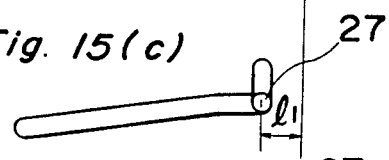
Figure 15D:
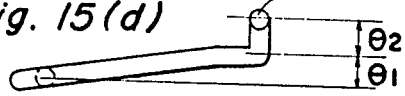

In view of the above, a separate lock device operable to disable the zooming operation must be employed. Referring to FIG. 14, a change-over ring 122 has defined therein a slant cam groove 120, an axial guide groove 123 and a circumferential groove 121 on one side of the groove 123 opposite to the groove 120, all being continued with each other. FIG. 15 illustrates different positions of the pin 27 in these grooves, wherein FIG. 15(a) illustrates the position of the pin 27 connected to or integral with the diaphragm holder 8 assumed when the zooming ring 5 is in the longest focal length position; FIG. 15(b) illustrates the condition established when the zooming ring 5 is rotated towards the wide angle range with the pin 27 consequently moved towards a position corresponding to the wide angle range; FIG. 15(c) illustrates the condition established when at the shortest focal length setting, the change-over ring 122 has been displaced a distance l leftwards, as viewed in FIG. 15, against a corrugated spring (not shown); and FIG. 15(d) illustrates the condition established when, starting from the condition of FIG. 15(c), the change-over ring 122 has been rotated an angular distance $\theta$, necessary to increase the diaphragm aperture, that is, the total distance of $\theta_1 + \theta_2$. It is to be noted that the angular distance $\theta_1$ is equal to a distance $\theta$ used and shown in FIG. 12 and that the angular distance $\theta_2$ is a distance required to cause the pin 27 to be engaged in the circumferential groove 121. Assuming that the pin 27 is positioned in the circumferential groove 121, the rotation of the zooming ring 5 towards the longest focal length position results in the pin 27 tending to move in a direction rearwardly of the lens assembly, that is, towards the camera body, because the pin 27 is rigidly mounted on the diaphragm holder 8. However, since the change-over ring 122, even though rotatable relative to the fixed barrel 3, can axially move only a small distance substantially equal to the amount of the deformation of the corrugated spring, resistance can be imposed on the rotation of the zooming ring 5, thereby disabling the zooming operation when and so long as the diaphragm aperture is large. It is to be noted that, if such a corrugated or compression spring as the spring 35 shown in FIG. 1 is inserted in a portion of the change-over ring 122, any possible entanglement of the pin 27 within the circumferential groove 121 which would occur when the zooming operation is unnecessarily performed, can advantageously be eliminated.

EMBODIMENTS OF APERTURE INDICATOR (FIGS. 17 TO 25)

In case of any zoon lens assembly wherein the aperture ratio does not vary with change in focal length, the aperture-indicating marking to be aligned with any one of the F-stop numbers calibrated on the diaphragm aperture adjusting ring generally comprises a single indicium, usually a line. On the other hand, the aperture-indicating marking generally comprise a pair of spaced indicia, main and auxiliary, in the case of any zoom lens assembly having its aperture ratio variable with change in focal length. When it comes to the zoom lens assembly according to this invention, since it can be considered a combined version of these types of the zoom lens assemblies, that is, it has the capability of functioning as the compensated and non-compensated models, the aperture-indicating marking is used in the form of at least two indicia arranged frontwardly of the diaphragm aperture adjusting ring.

Figure 17:
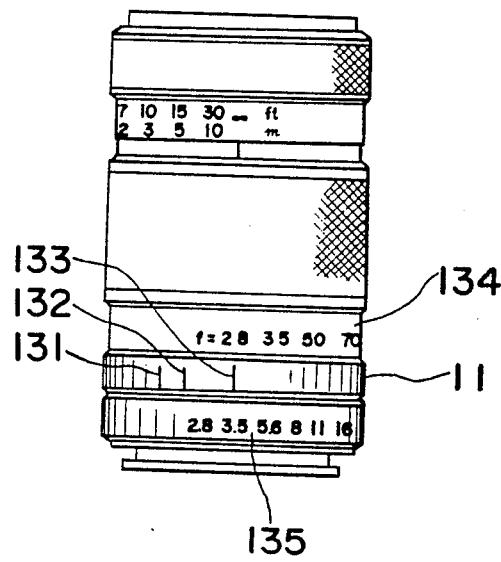
FIGS. 17, 19, 21 and 23 are side views of the zoom lens assembly set in a compensated mode, showing first, second, third and fourth embodiments of aperture-indicating marking, respectively.
Figure 18:
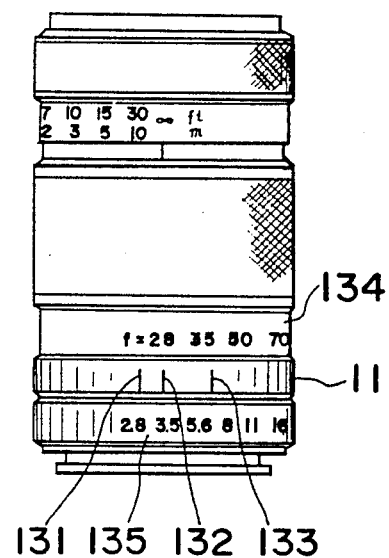
FIGS. 18, 20, 22 and 24 are views similar to FIGS. 17, 19, 21 and 23, respectively, showing the zoom lens assembly set in a non-compensated mode.

Referring first to FIGS. 17 and 18, there is shown a first embodiment of the aperture-indicating marking to be used in the lens assembly utilizing the mode change-over mechanism according to the first and other embodiments of this invention. In FIGS. 17 and 18, reference numeral 133 represents a common indicium to be aligned with any one of the F-stop numbers 135 calibrated on the aperture adjusting ring 12 in a manner known to those skilled in the art. This common indicium 133 is utilized when and so long as the lens assembly according to this invention is set in the compensated mode. Reference numerals 131 and 132 represent main and auxiliary indicia, respectively, both adapted to be utilized, in a manner, as described subsequently, when and so long as the zoom lens assembly according to this invention is set in the non-compensated mode. Specifically, when the zooming ring is rotated to the shortest focal length position, the main indicium 131 is used to indicate the smallest F-stop number 135 available for such shortest focal length setting, whereas when the zooming ring is rotated to the longest focal length position, the auxiliary indicia 132 is used to indicate the smallest F-stop number 135 available for such longest focal length setting, it being to be noted that the smallest F-stop number available for the shortest focal length setting reads a smaller value than that available for the longest focal length setting. This means that, during the non-compensated mode, for a full diaphragm aperture, the lens assembly is faster at the shortest focal length setting than at the longest focal length setting.

These indicia 133, 131 and 132 are provided on the change-over ring 11 and may be distinguished in different color, for example, the common indicium 133 being colored white, the main indicium 131 yellow and the auxiliary indicium 132 blue. It is naturally desirable that, once the respective colors to be used for the main and auxiliary indicia 131 and 132 have been fixed, respective numerical readings for the shortest and longest focal length positions 134 (28 and 85 so far shown) should also be colored in the same color as that of the main and auxiliary indicia 131 and 132 to make it possible to avoid any possible confusion and to facilitate an easy and quick reading of the F-stop number relative to the focal length setting. Instead of the use of the colored indicia, they may be distinguished by employing different types of marking, for example, a combination of line, triangle and dot, with or without relevant numerical representation.

In FIG. 17, the change-over ring is shown as assuming a position established when and so long as the ring 11 is set in the compensated mode position, while in FIG. 18 it is shown as assuming a different position established when and so long as the ring 11 is set in the non-compensated mode position.

Figure 19:
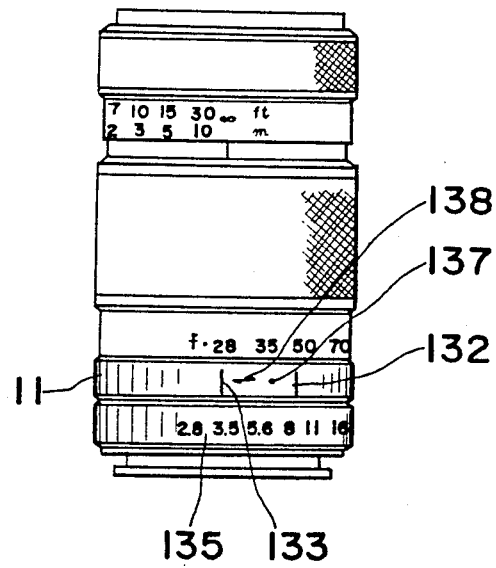
Figure 20:
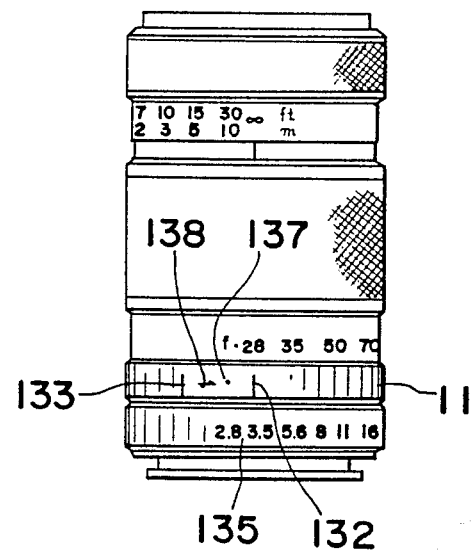

The aperture-indicating marking shown in FIGS. 19 and 20 is designed for use on the lens assembly according to the first and other embodiments of this invention. In FIG. 19, the main indicium 131 shown in FIG. 17 is replaced with a main indicium 137 and, in addition to the above difference, an arrow marking 138 is employed for the indication of the direction in which the change-over ring 11 can be rotated reciprocately. FIG. 20 illustrates the condition in which the lens assembly is set in the non-compensated mode.

Figure 21:
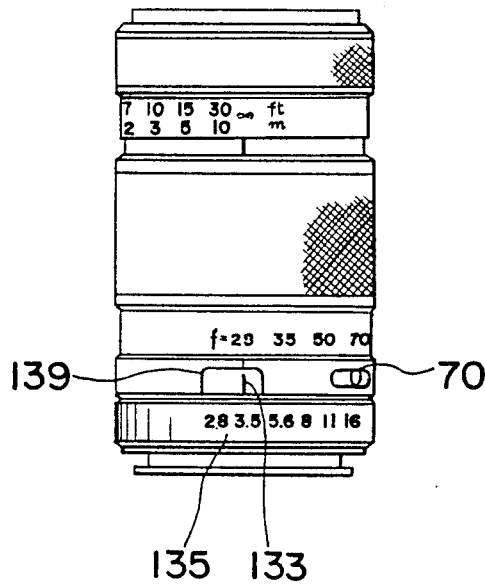
Figure 22:
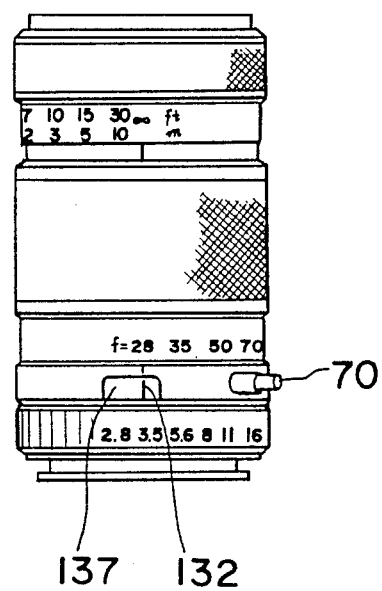

Referring now to FIGS. 21 and 22, there is shown the aperture-indicating marking adapted for use on the lens assembly according to the second embodiment of this invention. FIG. 21 illustrates the condition in which the lens assembly is set in the compensated mode while FIG. 22 illustrates the condition in which the lens assembly is set in the non-compensated mode.

While the aperture-indicating marking shown in FIGS. 17 and 18 and FIGS. 19 and 20 has been described as comprising the three indicia and the use of three indicia may be confusing, the embodiment shown in FIGS. 21 and 22 is designed such that any one of the aperture-indicating indicia can be displayed exteriorly through a window 139 defined in the fixed barrel 3 in a manner as shown in FIG. 5. The aperture-indicating indicia can be selectively brought into alignment with the window 139 for the visual presentation to the photographer by manipulating the change-over knob 70.

Figure 23:
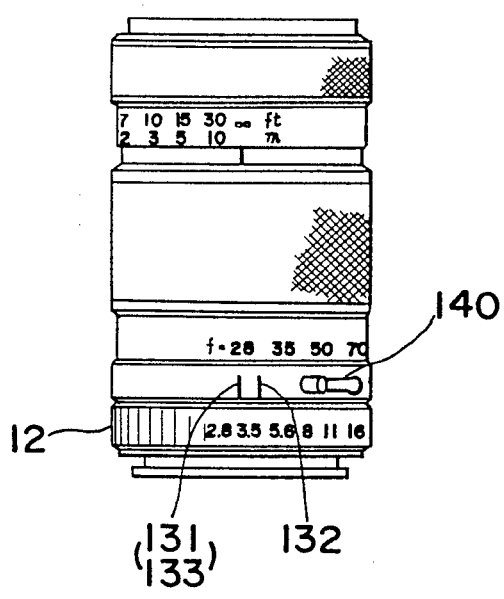
Figure 24:
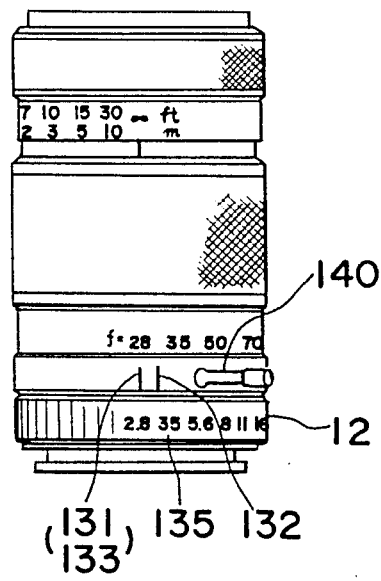
Figure 25A:
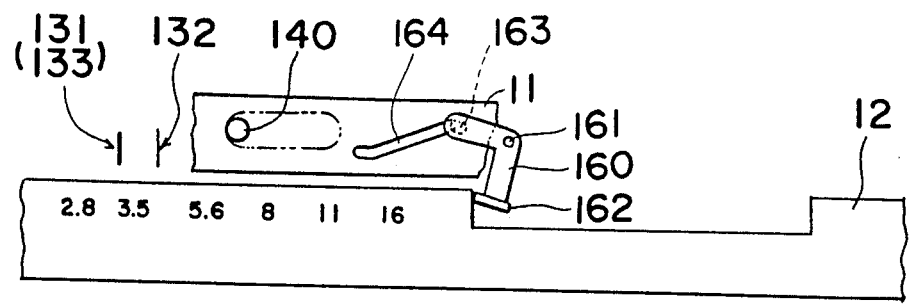
FIGS. 25(a) and 25(b) are diagrams showing a diaphragm aperture adjusting ring of FIGS. 23 and 24 developed in a plane, together with a stopper in different operative positions, respectively.
Figure 25B:
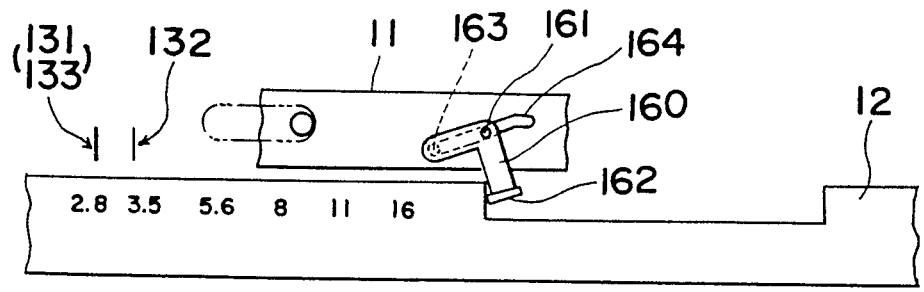

In the embodiment shown in FIGS. 24 and 25, the aperture-indicating indicia are so designed and so arranged that, while the respective positions of the aperture-indicating indicia does not vary, the position of a stopper (not shown) for the aperture adjusting ring 12 can be switched by manipulating a change-over lever 140. This embodiment of the aperture-indicating marking shown in FIGS. 23 and 24 is particularly suited for use in a SRL camera having its viewfinder system through which one of the F-stop numbers aligned with the relevant aperture-indicating indicium can be viewable. One method for switching the position of the stopper referred to above is shown in FIGS. 25(a) and 25(b). Although it is a currently employed practice to provide the aperture adjusting ring with an engagement recess in which a stopper pin can be engaged, a bell crank 160 is employed in place of the stopper pin referred to above, as shown in FIGS. 25(a) and 25(b). This bell crank 160 is pivotally mounted on the fixed barrel by means of a pivot pin 161 and has one end bent to define a stopper end 162 and the other end carrying a guide pin 163 rigidly secured thereto and loosely engaged in a guide groove 164. This system is so designed that the bell crank 160 can be pivoted in response to the movement of the change-over lever 140 to cause the position of the stopper to change automatically. It will readily be seen that FIG. 25(a) illustrates the condition assumed when the lens assembly is set in the compensated mode and, therefore, the F-stop number of 2.8 is inoperative, but FIG. 25(b) illustrates the condition assumed when the lens assembly is in the non-compensated mode with both aperture-indicating indicia being utilizeable one at a time according to the focal length setting.

EIGHTH EMBODIMENT FIGS. 26 AND 27)

The mode change-over mechanism according to the eighth embodiment shown in FIGS. 26 and 27 differs from that according to any one of the previously described first and fourth embodiments in the following two aspects. The first difference is that, while in the previously described embodiments, the rotation of the aperture adjusting ring 12 can be transmitted to the diaphragm operating ring 9 by the utilization of the linear groove 21 (FIG. 3) and the other elements and the diaphragm holder 8 can be rotated for the compensation purpose by the utilization of the cam groove portion 42 (FIG. 3) and the other elements, the embodiment shown in FIGS. 26 and 27 is such that a groove 21B functionally corresponding to the linear groove 21 defined in the arm of the preset ring 9 for transmitting the rotation of the adjusting ring 12 to the operating ring 9 is constituted by a cam groove defined in a single component part which acts concurrently for the diaphragm aperture setting and compensation purposes. The other difference is that the lens assembly shown in FIGS. 26 and 27 has an automatically presettable diaphragm mechanism incorporated therein and also has the capability of being set selectively in the compensated and non-compensated modes one at a time. The automatically presettable diaphragm mechanism referred to above is operable to stop the diaphragm aperture down to a predetermined value selected in association with the picture taking operation of the camera which is performed after the light measurement has been carried out at the full aperture setting. As a matter of course, this selection can be done even during the picture taking.

The details of the embodiment shown in FIGS. 26 and 27 will now be described. Referring to these figures, reference numeral 141 represents a transmission plate rigidly secured to, or formed integrally with, the change-over ring 11'. As best shown in FIG. 27, the change-over ring 11' is coupled to the diaphragm aperture adjusting ring 12 by means of a coupling pin 142 for rotation together therewith. Therefore, as the aperture adjusting ring 12 is preset to a certain F-stop number, the transmission plate 141 also rotates together with the adjusting ring 12. An aperture control cam plate 143 of generally arcuate or ring-shaped configuration has a radially outwardly extending projection 143A having its free end slidingly engaged in one of the cam and axial guide grooves 21B and 21A, for example, in the cam groove 21B so far shown, both defined in the transmission plate 141. In this illustrated condition, the cam plate 143 can rotate together with the adjusting ring 12 when the latter is preset. By rotating the aperture adjusting ring 12 about the optical axis in a direction shown by the arrow A in FIGS. 26 and 27, the diaphragm aperture can be stopped down.

Reference numeral 144 represents a generally arcuate main drive lever supported for pivotal movement about the axis shown by the chain line in FIG. 26. This main drive lever 144 is normally biased counterclockwise by a biasing spring 145. Operatively associated with this main drive lever 144 is a transmission pawl 146 situated within and protruding radially inwardly in the camera body. This transmission pawl 146 is engaged to the main drive lever 144 through an engagement pin 144A fast with the main drive lever 144, the transmission pawl 146 being operable to urge the main drive lever 144 clockwise about the optical axis against the biasing spring 145 after the completion of actual picture taking. When the main drive lever 144 is so rotated clockwise, an aperture-defining lever 147 of generally arcuate shape which is operatively coupled with the main drive lever 144 through a connecting rod 144B connected with the main drive lever 144 can be pivoted clockwise about the pivot axis shown by the chain line in FIG. 26. This aperture-defining lever 147 is in turn operatively associated with the diaphragm operating ring 9' by means of a spring 148 extending between 9'A connected with the operating ring 9' and a pin 143A connected with the aperture defining lever 147 and, therefore, the pin 9'A is normally biased to contact a lower end of the aperture defining lever 147. For this reason, when the aperture defining lever 147 is rotated clockwise in response to the clockwise rotation of the main drive lever 144 in the manner as hereinbefore described, the operating ring 9' rotates clockwise in pursuit of the lever 147, thereby causing the diaphragm blades 24 to open wide. This operating ring 9' has an arm 9'B extending radially outwardly therefrom and contacting a cam edge 149A of a compensating cam plate 149. When this arm 9'B abuts the cam edge 149A during the clockwise rotation of the aperture defining lever 147 and, hence, that of the operating ring 9', the operating ring 9' can be brought to a halt independently of the aperture defining lever 147 which continues its clockwise rotation with the spring 148 pulled axially outwardly. As is the case with any one of the previously described embodiments, the diaphragm operating lever 9' can move leftwards and rightwards one at a time during the zooming operation as viewed in the drawing. Since the leftward movement means the setting to the tele-angle range, as the focal length is adjusted towards the longest value, the operating ring 9' can be rotated clockwise a greater angular distance to increase the diaphragm aperture than as it is adjusted towards the shortest value. Therefore, when and so long as the focal length is adjusted towards the longest value, the operating ring 9' can be rotated clockwise a greater angular distance to increase the diaphragm aperture than as it is adjusted towards the shortest value. Therefore, when and so long as the focal length is adjusted to the longest reading, the diaphragm aperture is full open. In view of the foregoing, in a preset condition, the diaphragm aperture attains the maximum diameter at the longest focal length setting, and as the zooming ring is rotated towards the wide angle range, the diaphragm aperture is stopped down to make the maximum diaphragm aperture fixed at any focal length setting. When the aperture adjusting ring 12 is rotated in the direction of the arrow A to a desired aperture reading from smallest F-stop number, the aperture control cam plate 143 is rotated counterclockwise to a predetermined position corresponding to the desired aperture reading. Subsequent retraction of the transmission pawl 146 which takes place in association with the picture taking, causes the main drive lever 144 to rotate counterclockwise against the spring 145. Upon this counterclockwise rotation of the main drive lever 144, the aperture defining lever 147 coupled thereto through the connecting rod 144B is also rotated counterclockwise, thereby causing the aperture operating ring 9' to be rotated counterclockwise by means of the pin 9'A until a pin 147B rigidly mounted on the aperture defining lever 147 abuts a projection 143B integral with the cam plate 143. When the pin 147B on the aperture defining lever 147 is so engaged to the projection 143B integral with the cam plate 143 in the manner as hereinabove described, the aperture defining lever 147 is no longer rotated and the diaphragm aperture is therefore stopped down to a diameter corresponding to the desired, preset aperture reading. FIGS. 26 and 27 illustrate the condition in which the lens assembly is set in the compensated mode. Since the projection 143A integral with the cam plate 143 is engaged in the cam groove 21B, the cam plate 143 rotates, as the zooming ring is turned, with the pin 147B moving in contact with the projection 143B and, therefore, the diaphragm aperture is compensated for change in aperture ratio resulting from the change of the focal length.

Where the lens assembly is desired to be set in the non-compensated mode, the projection 143A integral with the cam plate 143 has to be brought into engagement with the axial guide groove 21A and the cam plate 149 has to be subsequently retracted from the path of angular movement of the arm 9'B integral with the diaphragm holder 9'. A mechanism for this purpose is shown in FIG. 27.

Referring particularly to FIG. 27, the aperture adjusting ring 12 has a pair of deep and shallow recesses 12A and 12B defined therein for engagement with the coupling pin 142 one at a time. The coupling pin 142 fast with the aperture adjusting ring 12 is engaged in the recess 12A so far shown in FIG. 27, in which condition the lens assembly is in the compensated mode. The change-over to the non-compensated mode can be carried out when and so long as the focal length is adjusted to the shortest reading. Assuming that the zooming ring is rotated to the smallest focal length position, and when the change-over ring 11' is pulled leftwards as viewed in FIG. 27 against the spring 35, the projection 143A of the cam plate 143 is brought in position ready to enter a connecting groove 21C. Subsequent turn of the change-over ring 11' in the direction of the arrow to bring the coupling pin 142 into engagement with the recess 12B results in that the projection 143A is brought in position ready to enter the axial guide groove 21A. The manner by which the change-over ring 11' is manipulated is substantially identical with that in any one of the foregoing embodiments and, therefore, the lock mechanism for avoiding the unnecessary or accidental change-over, which has been described in connection with any one of the foregoing embodiments can be employed. In any event, when the coupling pin 142 has been shifted from the recess 12A to the recess 12B in the manner as hereinbefore described, the change-over ring 11' is positioned a slight distance displaced leftwards as viewed in FIG. 27 as compared with the position occupied by the same ring 11' when the coupling pin 142 is engaged in the recess 12A. This is because the recess 12B has a depth smaller than the recess 12A. In this condition, a bell crank 150 engageable with the change-over ring 11' is pivoted clockwise, as viewed in FIG. 27, from the position shown by the solid line. Upon this pivot of the bell crank 150, one end of the bell crank 150 remote from the change-over ring 11' pushes a pin 149B, rigidly mounted on the cam plate 149, and, therefore, the cam plate 149 is moved upwards as viewed in FIG. 27 against a spring 151 with the cam edge 149A consequently brought in position out of the path of angular movement of the arm 9'B integral with the diaphragm operating ring 9', thereby completing the change-over of the lens assembly into the non-compensated mode.

The aperture-indicating marking to be used on the lens assembly according to the embodiment described with reference to and shown in FIGS. 26 and 27 is in the form as including, in addition to the indicia 131, 132 and 133 on the fixed barrel 3, a triangular reference indicium 170 provided on the aperture adjusting ring 12, and a pair of spaced indicia 171A and 171B provided on the change-over ring 11' and signifying the non-compensated mode and the compensated mode, respectively, the indicia 171A and 171B being adapted to be lined up with the reference indicium 170 one at a time to indicate the mode in which the lens assembly is set.

NINTH EMBODIMENT (FIG. 28)

The lens assembly according to this embodiment, shown in FIG. 28, employs the compensating mechanism for the preset aperture which is substantially identical with that shown in FIGS. 26 and 27, but does not employ a full aperture compensating member for the full aperture light metering system. This embodiment is a system wherein the stop-down number over which the diaphragm aperture should be stopped down from the smallest F-stop number is input to a photographic camera of full aperture metering system. A connecting lever 152 for transmitting the stop-down number shown in FIG. 28 is a member provided for this purpose. Even in this embodiment, the lens assembly shown in FIG. 28 is similar to that shown in FIGS. 26 and 27 in that the change-over ring 11' is rotatable together with the aperture adjusting ring 12 to adjust the diaphragm aperture and in that the mode change-over can be effected by selecting the position of the change-over ring 11' relative to the aperture adjusting ring 12. Although the lens assembly so far shown is in the compensated mode in which the diaphragm aperture is automatically compensated with the focal length setting to maintain the diaphragm aperture at a predetermined value, since the lens assembly is not provided with a full aperture compensating cam to be used during the full aperture light measurement as is the case with the embodiment shown in FIGS. 26 and 27, the diaphragm aperture at the smallest F-stop number is fixed irrespective of the zooming operation and, therefore, the intensity of light falling on the light receiving face of a photo-cell forming a part of the light measuring device of the camera may vary to such an extent as to result in erroneous exposure. Therefore, in order to avoid the erroneous exposure, information of the stop-down number variable with the zooming operation is input to the camera instead of the use of the full aperture compensating cam. The function in which the stop-down number information is adjustably coupled to the camera body will now be described with reference to FIG. 28.

A linkage ring 153 for the compensation of the stop-down number has a pair of pins 153A and 153B rigidly mounted thereon. So far shown in FIG. 27, the pin 153A is shown as engaged in the groove 21B' in the change-over ring while the other pin 153B is shown as engaged with the connecting lever 152. During the zooming operation, the ring 153 is axially moved together with, for example, the rear movable lens mount and can also be rotatable freely. Therefore, as the aperture adjusting ring 12 is rotated, the ring 153 is also rotated by the engagement between the pin 153A and the groove 21B' in the change-over ring 12 rotatable together with the adjusting ring 12. the rotation of the ring 153 being transmitted through the lever 152 to the camera body to vary the stop-down number input to the camera. By so doing, change in intensity of the light falling on the light receiving face of the photo-cell of a light meter incorporated in the camera can be compensated for to give a correct exposure value. Where the mode change-over is to be effected, the zooming ring has to be moved to the shortest focal length position and the change-over ring 11' has to be subsequently moved leftwards, as viewed in FIG. 28, against the spring 35 before it is rotated in the direction of the arrow A. As is the case with the embodiment shown in FIGS. 26 and 27, when the change-over ring 11, which moved leftwards, is rotated, the coupling pin 142 can be brought into alignment with the recess 12B, the actual engagement of the pin 142 into the recess 12B taking place when an external pulling force applied to the ring 11' to displace the latter leftwards is released. In this way, the projection 143A, integral with the cam plate 143, and the pin 153A on the ring 153, are engaged in an axial guide groove 21A and an axial guide groove 21A', respectively, and therefore, not only can the lens assembly be set in the non-compensated mode, but also the adjustment of the stop-down number input to the camera is no longer effected. It is to be noted that a mechanism operable to permit the mode change-over to be performed only at the smallest or longest focal length setting may be the one described in connection with any one of the foregoing embodiments.

MODIFICATION (FIG. 29)

In the first embodiment shown in FIGS. 1 to 4, the cam plate 10 has been described as rigidly secured to the change-over ring 11 and having the axial guide groove 40 and the cam groove 42 defined therein. However, in the modification shown in FIG. 29, the cam plate is rigidly secured to the fixed barrel 3 as shown by 10' and has only a cam groove 42' corresponding functionally to the cam groove 42 best shown in FIG. 3. In addition, in this modification, the preset ring is constituted by front and rear ring elements, the front ring element having the linear groove 21 defined in the arm thereof. The ring elements are normally held in a predetermined position relative to each other by a tension spring suspended therebetween, and an arm fast with or integral with the change-over ring 11 rotatable only at the shortest focal length setting is held in position ready to engage the front ring element whenever the necessity occurs. In this modification, where the diaphragm aperture is desired to be increased to a greater diameter, the change-over ring 11 has to be rotated so that the front ring element can be rotated relative to the rear ring element against the tension spring thereby causing the diaphragm, operating ring 9 to be rotated to a position corresponding to the smallest F-stop number available for the longest focal length setting. By so doing, the diaphragm aperture can be adjusted to give the greater diameter.

Although this invention has fully been described in connection with the numerous embodiments with reference to the accompanying drawings, it is to be noted that various changes and modifications are apparent to those skilled in the art upon the reading this disclosure. By way of example, the function of the change-over ring may be utilized to adjust the amount of extension of a signaling pin which is, in most cameras requiring the physical transmission of information concerning the speed of a selected interchangeable lens assembly, necessitated to transmit such information.

In addition, although reference has been made to the zoom lens assembly of a type wherein the optical system is so designed that the position of focus does not vary with the zooming, the concept of this invention can be equally applicable to a so-called varifocal lens assembly wherein the position of focus varies with the zooming.

Therefore, such changes and modification are to be understood as included within the scope of this invention as defined in the appended claims, unless they depart therefrom.

I claim:

1. An objective lens assembly of variable focal length comprising, in combination:
    a varifocal lens system having its focal length adjustable within a predetermined range, said lens system including a diaphragm mechanism having an adjustable diaphragm aperture, the aperture ratio being variable during an operation for changing the focal length with the diaphragm aperture kept unchanged;
    a diaphragm aperture adjustng mechanism for adjusting the diaphragm aperture for compensating for change in aperture ratio realtive to the change in focal length within the predetermined range;
    a diaphragm aperture maintaining mechanism operable to maintain the diaphragm aperture while allowing the aperture ratio to change within a portion of the predetermined range; and
    a manually operable change-over mechanism operable to bring the diaphragm aperture adjusting and maintaining mechanisms selectively into an operative position one at a time.

2. An assembly as claimed in claim 1, wherein said maintaining mechanism is adapted to maintain the diaphragm aperture so as to vary the aperture ratio within the predetermined range.

3. An assembly as claimed in claim 1, wherein said maintaining mechanism is adapted to maintain the diaphragm aperture so as to vary the aperture ratio only at the shortest focal length setting or in the vicinity thereof within the predetermined range.

4. An assembly as claimed in claim 1, wherein said change-over mechanism includes a change-over member rotatable about the optical axis of the lens system and movable in a direction parallel to the optical axis, said adjusting and mantaining mechanisms being selectively brought into the operative position one at a time in response to the rotation and subsequent axial movement of the change-over member.

5. An assembly as claimed in claim 1, further comprising a locking means for releaseably locking the change-over means, said locking means operable to release the change-over mechanism only when the lens system is set to a particular focal length within the predetermined range.

6. An assembly as claimed in claim 5, wherein the lens system includes at least one lens group movable in a direction parallel to the optical axis of the lens system for changing the focal length, and further comprising a movable lens holder for the support of said lens group, said locking means including a locking mechanism for locking the change-over mechanism, and a detection means for detecting the movement of said movable lens holder in the direction parallel to the optical axis to a predetermined position at which the lens system is set at the particular focal length and for causing the locking mechanism to release the change-over mechanism from a locked position.

7. An assembly as claimed in claim 5, further comprising an operating member rotatable about the optical axis for changing the focal length.

8. An assembly as claimed in claim 7, wherein said locking means comprises a locking mechanism for locking the change-over mechanism, and a detection means for detecting the condition in which the operating member is operated to a position at which the lens system is set at the particular focal length and for causing the locking mechanism to release the change-over mechanism from a locked position.

9. An assembly as claimed in claim 1, further comprising a diaphragm preset ring for presetting the diaphragm mechanism, said preset ring having a series of numerical figures provided thereon, said numerical figures representing the F-stop numbers to which the diaphragm mechanism can be preset one at a time, respectively, a first indexing means cooperable with the series of numerical figures to indicate one of the numerical figures when the adjusting mechanism is brought into the operative position by the change-over mechanism, and a second indexing means cooperable with the series of numerical figures to indicate one of the numerical figures when the maintaining mechanism is brought into the operative position by the change-over mechanism.

10. An assembly as claimed in claim 9, wherein said change-over mechanism is rotatable about the optical axis of the lens system and movable in a direction parallel to the optical axis for bringing the adjusting and maintaining mechanisms selectively into the operative position one at a time, and wherein said first and second indexing means are provided on the change-over member in circumferentially spaced relation to each other.

11. An assembly as claimed in claim 9, further comprising a stationary barrel having the first and second indexing means provided in circumferentially spaced relation to each other, a restriction means for restricting the rotatable range over which the preset ring can be rotated, and means for changing the rotatable range of the preset ring in dependence on the selection of one of the adjusting and maintaining mechanisms performed by the change-over mechanism.

12. An objective lens assembly of variable focal length comprising, in combination:
   a stationary barrel;
   a varifocal lens system having its focal length adjustable within a predetermined range, and including at least one lens group axially movable in a direction parallel to the optical axis thereof for the adjustment of the focal length;
   a manually operable member adapted to be operated relative to the stationary barrel for varying the focal length of the lens system;
   a diaphragm mechanism including first and second member rotatable relative to each other about the optical axis, and a plurality of diaphragm blades defining a diaphragm aperture of a diameter determined by the relative rotation of the first and second members, said diaphragm mechanism being axially movable in a direction parallel to the optical axis in correspondence with the change in focal length of the lens system to vary the aperture ratio with the diameter of the diaphragm aperture kept unchanged;
   a diaphragm aperture adjusting mechanism for varying the relative position between the first and second members at the time of axial movement of the diaphragm mechanism to adjust the diaphragm aperture for maintaining the aperture ratio at a constant value relative to the change in focal length within the predetermined range;
   a diaphragm aperture maintaining mechanism for maintaining the relative position between the first and second members at the time of axial movement of the diaphragm mechanism to vary the aperture ratio for maintaining the diaphragm aperture at a constant value; and
   a manually operable change-over mechanism for bringing the adjusting and maintaining mechanisms selectively into an operative position one at a time.

13. An assembly as claimed in claim 12, wherein said change-over member is rotatable about the optical axis of the lens system.

14. An assembly as claimed in claim 13, wherein said adjusting mechanism comprises a cam member integral with the change-over member, a cam follower provided on one of the first and second members, and a first cam provided on the cam member so as to be inclined relative to the direction parallel to the optical axis for engagement with the cam follower, wherein said maintaining mechanism comprises said cam member, said cam follower and a second cam provided on the cam member in parallel relation to the optical axis of the lens system for engagement with the cam follower, and wherein said change-over mechanism also includes a guide means on the cam member for guiding the cam follower from one of the first and second cams onto the other of the first and second cams at the time of rotation of the change-over member.

15. An assembly as claimed in claim 14, further comprising an aperture preset ring, a stop-down member for rotating the other of the first and second members relative to said one of the first and second members for reducing the diaphragm aperture, and a restriction means for restricting the final operative position for the stop-down member in dependence on the position to which the preset ring has been rotated.

16. An assembly as claimed in claim 14, wherein the change-over member is displaceable a predetermined distance from a normal axial position in a direction parallel to the optical axis, said guide means being operable only when the change-over member is axially displaced the predetermined distance to guide the cam follower from the one of the first and second cams onto the other of the first and second cams.

17. An assembly as claimed in claim 16, further comprising a movable lens holder for supporting the lens group, a lock means for locking the change-over member to prevent the change-over member from being rotated, and means for disabling said locking means only when the movable lens holder is held at a position at which the lens system is set at a particular focal length within said predetermined range.

18. An assembly as claimed in claim 16, further comprising a lock means for locking the change-over member for preventing the change-over member from being rotated, and means for disabling the lock means only when the manually operable member is rotated to a position at which the lens system is set at a particularly focal length within the predetermined range.

19. An objective lens assembly of variable focal length which comprises, in combination:
  a varifocal lens system having its focal length adjustable within a predetermined range, said lens system including a diaphragm mechanism having an adjustable diaphragm aperture, the aperture ratio being variable during an operation for changing the focal length with the diaphragm aperture kept unchanged;
  a diaphragm aperture adjusting mechanism for adjusting the diaphragm aperture for compensating for change in aperture ratio relative to the change in focal length within the predetermined range;
  a diaphragm aperture maintaining mechanism for maintaining the diaphragm aperture while allowing the aperture ratio to change within a portion of the predetermined range; and
  a manually operable mechanism for setting the diaphragm aperture at a diameter necessary to increase the aperture ratio at the shortest focal length setting or in the vicinity thereof within the predetermined range, whereby the aperture ratio so increased is equal to the aperture ratio given by the diaphragm mechanism at the smallest focal length setting or in the vicinity thereof when no diaphragm aperture adjustment is performed by the diaphragm aperture adjusting mechanism.

20. An assembly as claimed in claim 19, wherein the manually operable mechanism includes a rotatable member adapted to be rotated a predetermined angle about the optical axis of the lens system, and wherein the diaphragm aperture adjusting mechanism includes a cam formed on the rotatable member so as to be inclined relative to the optical axis and a cam follower engaged with the cam for varying the diaphragm aperture.

21. An assembly as claimed in claim 20, wherein the rotatable member is displaceable a predetermined distance from a normal axial position in a direction parallel to the optical axis, said cam having one end extended a distance equal to the predetermined distance to provide a extension of the cam.

22. An assembly as claimed in claim 21, wherein said extension has one end opposite to the cam formed with an engagement cam extending in a direction parallel to the direction of rotation of the rotatable member, said engagement cam being operable to engage the cam follower to inhibit the adjustment of the diaphragm aperture by the diaphragm aperture adjusting mechanism while the aperture ratio has been increased.

* * * * *